(12) United States Patent
Sodeyama

(10) Patent No.: US 11,581,568 B2
(45) Date of Patent: Feb. 14, 2023

(54) SECONDARY BATTERY, BATTERY PACK, ELECTRIC VEHICLE, POWER STORAGE SYSTEM, POWER TOOL, AND ELECTRONIC DEVICE

(71) Applicant: MURATA MANUFACTURING CO., LTD., Kyoto (JP)

(72) Inventor: Kunio Sodeyama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 784 days.

(21) Appl. No.: 16/441,704

(22) Filed: Jun. 14, 2019

(65) Prior Publication Data

US 2019/0296304 A1 Sep. 26, 2019

Related U.S. Application Data

(63) Continuation of application No. PCT/JP2017/037207, filed on Oct. 13, 2017.

(30) Foreign Application Priority Data

Dec. 16, 2016 (JP) .............................. JP2016-244511

(51) Int. Cl.
*H01M 10/0525* (2010.01)
*B60L 58/18* (2019.01)
(Continued)

(52) U.S. Cl.
CPC ........... *H01M 10/0525* (2013.01); *B25F 5/02* (2013.01); *B60L 50/64* (2019.02); *B60L 58/18* (2019.02);
(Continued)

(58) Field of Classification Search
None
See application file for complete search history.

(56) References Cited

U.S. PATENT DOCUMENTS 4,943,497 A 7/1990 Oishi et al.
6,733,917 B1 5/2004 Janmey
(Continued)

FOREIGN PATENT DOCUMENTS

CN 102549802 7/2012
EP 2 472 634 7/2012
(Continued)

OTHER PUBLICATIONS

European Search Report dated May 4, 2020 in corresponding European Application No. 17880963.8.
(Continued)

*Primary Examiner* — Carmen V Lyles-Irving
(74) *Attorney, Agent, or Firm* — K&L Gates LLP

(57) ABSTRACT

A secondary battery includes a battery element including a positive electrode, a negative electrode, and an electrolytic solution, a housing member configured to accommodate the battery element, and a safety valve mechanism attached to the housing member. The safety valve mechanism includes a valve member including an opening valve portion configured to be opened; and an opening member including a plurality of opening portions radially arranged in a region opposed to the opening valve portion from a center of the region as a base point, and a plurality of protrusion portions radially arranged in a region outside the plurality of opening portions from the center and the plurality of protrusion portions protrude toward the plurality of opening portions. A number of the opening portions and a number of the protrusion portions are equal to each other, and each of the plurality of opening portions and each of the plurality of protrusion portions are opposed to each other in a direction toward the center.

7 Claims, 12 Drawing Sheets

(51) Int. Cl.
- *B60L 50/64* (2019.01)
- *B25F 5/02* (2006.01)
- *H01M 10/0566* (2010.01)
- *H01M 10/052* (2010.01)
- *H01M 50/317* (2021.01)
- *H01M 50/20* (2021.01)
- *H01M 50/30* (2021.01)
- *H01M 50/147* (2021.01)
- *H01M 50/213* (2021.01)

(52) U.S. Cl.
CPC ..... *H01M 10/052* (2013.01); *H01M 10/0566* (2013.01); *H01M 50/147* (2021.01); *H01M 50/20* (2021.01); *H01M 50/213* (2021.01); *H01M 50/30* (2021.01); *H01M 50/317* (2021.01); *Y02E 60/10* (2013.01); *Y02T 10/70* (2013.01)

(56) References Cited

U.S. PATENT DOCUMENTS

| | | | |
|---|---|---|---|
| 2008/0107957 A1 | 5/2008 | Meguro et al. | |
| 2009/0081530 A1* | 3/2009 | Hashimoto | H01M 50/56 |
| | | | 429/185 |
| 2011/0076527 A1* | 3/2011 | Kim | H01M 50/166 |
| | | | 429/53 |
| 2014/0127568 A1* | 5/2014 | Kawakami | H01M 4/364 |
| | | | 252/502 |
| 2014/0356695 A1* | 12/2014 | Abe | B60L 53/00 |
| | | | 429/223 |
| 2015/0333313 A1 | 11/2015 | Yamato et al. | |

FOREIGN PATENT DOCUMENTS

| | | |
|---|---|---|
| JP | H08115715 A | 5/1996 |
| JP | 2004152697 A | 5/2004 |
| JP | 2006521678 A | 9/2006 |
| JP | 2006302734 A | 11/2006 |
| JP | 2007200755 A | 8/2007 |
| JP | 2009193862 | 8/2009 |
| JP | 2009193862 A | 8/2009 |
| JP | 2009266714 A | 11/2009 |
| JP | 2013506954 A | 2/2013 |
| JP | 2013218875 | 10/2013 |
| WO | 2014097586 A1 | 6/2014 |

OTHER PUBLICATIONS

International Search Report for Application No. PCT/JP2017/037207, dated Nov. 21, 2017.

* cited by examiner

SECONDARY BATTERY, BATTERY PACK, ELECTRIC VEHICLE, POWER STORAGE SYSTEM, POWER TOOL, AND ELECTRONIC DEVICE

CROSS REFERENCE TO RELATED APPLICATIONS

The present application is a continuation of PCT patent application no. PCT/JP2017/037207, filed on Oct. 13, 2017, which claims priority to Japanese patent application no. JP2016-244511 filed on Dec. 16, 2016, the entire contents of which are being incorporated herein by reference.

BACKGROUND

The present technology generally relates to a secondary battery including a safety valve mechanism, and relates to a battery pack, an electric vehicle, a power storage system, a power tool, and an electronic device which use the secondary battery.

Various electronic devices such as mobile phones and personal digital assistants (PDA) have been widely diffused, and there has been demand for reduction in size, reduction in weight, and increase in life for the electronic devices. Therefore, the development of batteries, in particular, small-size and light-weight secondary batteries capable of acquiring a high energy density has been advanced as power supplies.

The secondary batteries are considered to be applied not only to the electronic devices mentioned above, but also to other uses. An example of the other uses is a battery pack that is detachably mounted on an electronic device or the like, an electric vehicle such as an electric car, a power storage system such as a home electric power server, and a power tool such as an electric drill.

The secondary battery includes an electrolytic solution together with a positive electrode and a negative electrode. Further, the secondary battery includes a safety valve mechanism capable of releasing gas, in order to suppress occurrence of troubles caused by gas generated due to a decomposition reaction of the electrolytic solution or the like.

The configuration of the safety valve mechanism greatly affects the safety of the secondary battery, and thus various studies have been made regarding the configuration of the safety valve mechanism.

Specifically, in order to release the gas, a plurality of ventilation holes is provided in component parts (safety valves or the like) of the safety valve mechanism.

SUMMARY

The electronic devices and the like have been more and more increased in performance and function. For this reason, the frequency of use of electronic devices and the like has been increased, and the usage environment for the electronic devices and the like has been expanded. Therefore, there is still room for improvement regarding the safety of the secondary batteries.

Accordingly, it is desirable to provide a secondary battery, a battery pack, an electric vehicle, a power storage system, a power tool, and an electronic device, which are capable of improving safety.

A secondary battery according to an embodiment of the present technology includes a battery element that includes a positive electrode, a negative electrode, and an electrolytic solution, a housing member configured to accommodate the battery element, and a safety valve mechanism that is attached to the housing member. The safety valve mechanism includes a valve member including an opening valve portion configured to be opened; and an opening member including a plurality of opening portions radially arranged in a region opposed to the opening valve portion from a center of the region as a base point, and a plurality of protrusion portions radially arranged in a region outside the plurality of opening portions from the center and the plurality of protrusion portions protrude toward the plurality of opening portions. A number of the opening portions and a number of the protrusion portions are equal to each other, and each of the plurality of opening portions and each of the plurality of protrusion portions are opposed to each other in a direction toward the center.

Each of a battery pack, an electric vehicle, a power storage system, a power tool, and an electronic device according to an embodiment of the present technology includes a secondary battery, and the secondary battery has the same configuration as that of the secondary battery according to an embodiment of the present technology as described above.

According to the secondary battery of an embodiment of the present technology, the safety valve mechanism includes a valve member and an opening member. The valve member includes an opening valve portion, and the opening member includes a plurality of opening portions radially arranged and a plurality of protrusion portions radially arranged outside the plurality of opening portions. A number of the opening portions and a number of the protrusion portions are equal to each other, and each of the plurality of opening portions and each of the plurality of protrusion portions are opposed to each other in a direction toward the center.

Therefore, the safety of the secondary battery can be improved. In addition, the battery pack, the electric vehicle, the power storage system, the power tool, and the electronic device according to an embodiment of the present technology each achieve a similar effect.

It should be understood that the effects described herein are not necessarily limited, and other suitable properties relating to the present technology may be realized and as further described.

DETAILED DESCRIPTION

As described herein, the present disclosure will be described based on examples with reference to the drawings, but the present disclosure is not to be considered limited to the examples, and various numerical values and materials in the examples are considered by way of example.

First, a secondary battery according to an embodiment of the present technology will be described.

The secondary battery described herein is, for example, a lithium ion secondary battery in which a capacity of a negative electrode is obtained through the occlusion and release of lithium as an electrode reactant.

First, the overall configuration of the secondary battery will be described.

Figure 1:
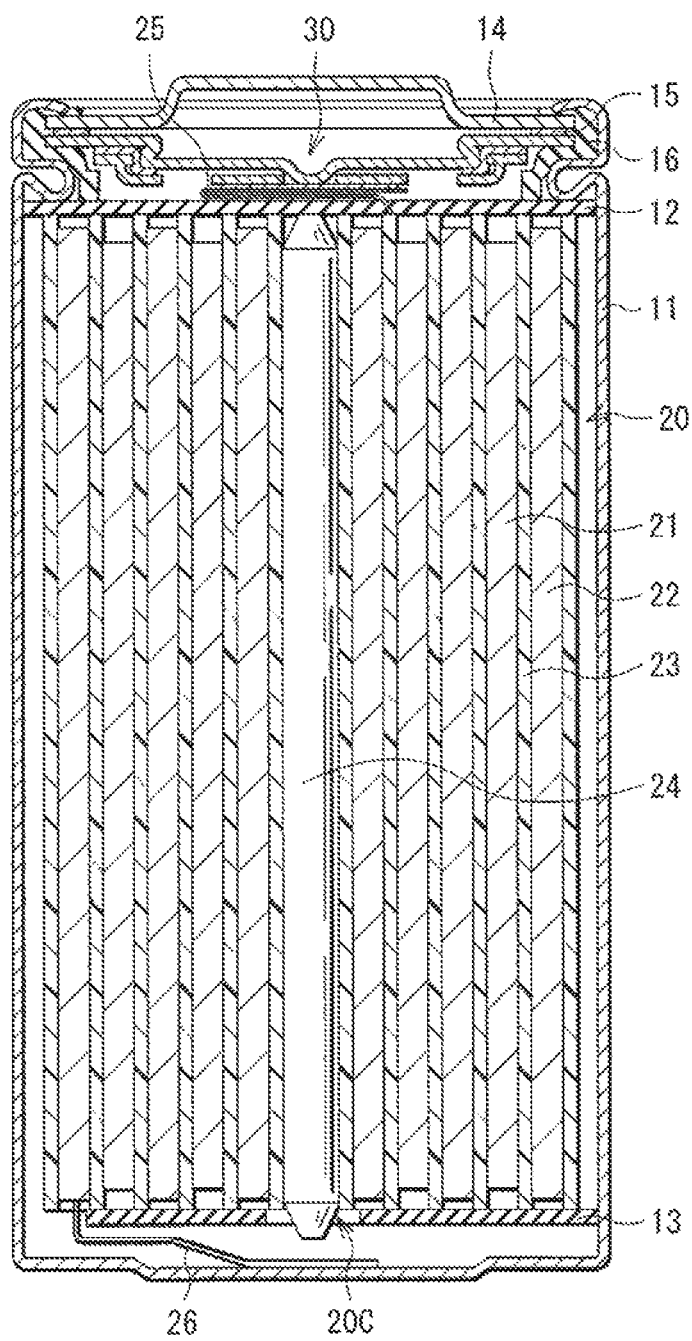
FIG. 1 is a cross-sectional view illustrating a configuration of a secondary battery according to an embodiment of the present technology.

FIG. 1 illustrates the configuration of the cross-section of the secondary battery. The secondary battery is, for example, a cylindrical secondary battery in which a wound electrode body 20 is housed inside a battery can 11, as illustrated in FIG. 1. The battery can 11 is a "housing member" according to an embodiment of the present technology, and the wound electrode body 20 is a "battery element" according to an embodiment of the present technology.

More specifically, in the cylindrical secondary battery, for example, a pair of insulating plates 12 and 13, a thermosensitive resistive element (PTC) 15, and the wound electrode body 20 are housed inside the columnar battery can 11. A safety valve mechanism 30 is attached to the battery can 11, and the battery can 11 is sealed, for example, with a battery cover 14.

The battery can 11 has, for example, a hollow structure with one end closed and the other end open, and contains, any one of, or two or more of metal materials such as iron, aluminum, and alloys thereof. The surface of the battery can 11 may be plated with any one of, or two or more of metal materials such as nickel. The pair of insulating plates 12 and 13 sandwiches the wound electrode body 20, and is disposed to extend perpendicularly to the wound circumferential surface of the wound electrode body 20.

For example, the battery cover 14, the thermosensitive resistive element 15, and the safety valve mechanism 30 are crimped to an opening end of the battery can 11 using a gasket 16. The battery cover 14 is a member which mainly seals the battery can 11, and includes, for example, the same material as the material for forming the battery can 11. The thermosensitive resistive element 15 includes a resistor (thermistor) whose electrical resistance greatly changes in response to the change in temperature. In particular, the electrical resistance of the thermosensitive resistive element 15 rapidly increases when the internal temperature of the secondary battery exceeds a predetermined temperature, in order to prevent abnormal heat generation of the secondary battery due to a large current. The safety valve mechanism 30 is electrically connected to the battery cover 14 via the thermosensitive resistive element 15. The configuration of the safety valve mechanism 30 will be described later. The gasket 16 includes, for example, any one of, or two or more of insulating materials, and the surface of the gasket 16 may be coated with, for example, any one of, or two or more of, insulating materials such as asphalt.

The wound electrode body 20 includes a positive electrode 21, a negative electrode 22, and an electrolytic solution as a liquid electrolyte. For example, the positive electrode 21 and the negative electrode 22 stacked with a separator 23 interposed therebetween are wound for the wound electrode body 20. The separator 23 is impregnated with the electrolytic solution, and each of the positive electrode 21 and the negative electrode 22 may be impregnated with the electrolytic solution.

For example, a space (a wound center space 20C) generated when winding the positive electrode 21, the negative electrode 22, and the separator 23 is provided at the center of the wound electrode body 20. For example, a center pin 24 is inserted into the wound center space 20C. However, the center pin 24 is not necessarily inserted into the wound center space 20C.

For example, a positive electrode lead 25 is connected to the positive electrode 21, and for example, a negative electrode lead 26 is connected to the negative electrode 22. The positive electrode lead 25 includes any one of, or two or more of conductive materials such as aluminum. The positive electrode lead 25 is, for example, connected to the safety valve mechanism 30, and electrically connected to the battery cover 14. The negative electrode lead 26 includes any one of, or two or more of conductive materials such as nickel. The negative electrode lead 26 is, for example, connected to the battery can 11, and electrically connected to the battery can 11.

Subsequently, the configuration of the safety valve mechanism 30 will be described.

Figure 2:
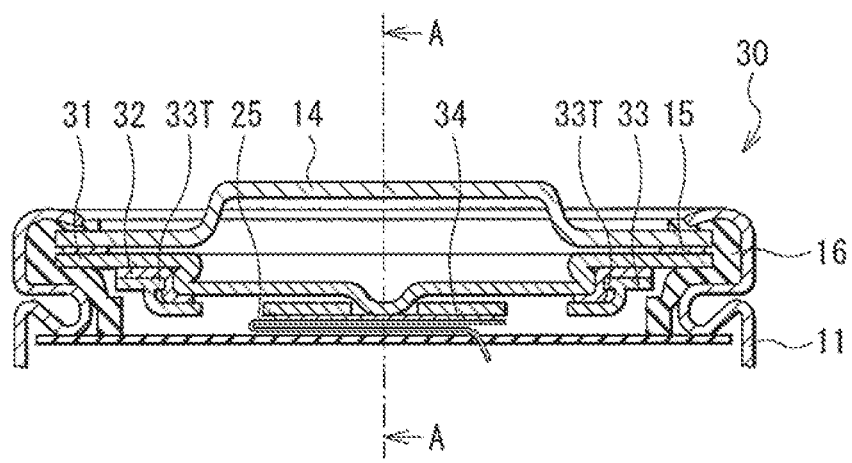
FIG. 2 is an enlarged cross-sectional view illustrating a configuration of a main part of the secondary battery illustrated in FIG. 1 (in a state before a safety cover is opened) according to an embodiment of the present technology.
Figure 4:
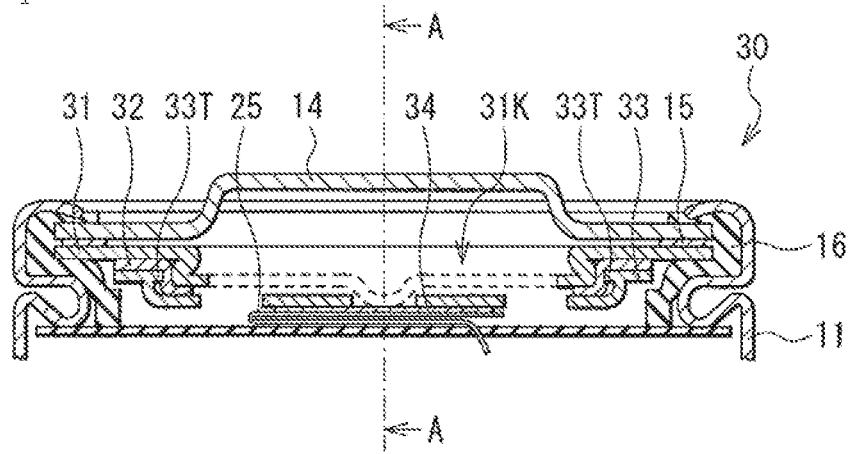
FIG. 4 is an enlarged cross-sectional view illustrating a configuration of the safety valve mechanism illustrated in FIG. 1 (in a state after the safety cover is opened) according to an embodiment of the present technology.

FIGS. 2 and 4 each illustrate an enlarged cross-sectional view of the configuration of a main part (the safety valve mechanism 30 and its periphery) of the secondary battery illustrated in FIG. 1. In this regard, FIG. 2 illustrates a state before the safety cover 31 is opened, and FIG. 4 illustrates a state after the safety cover 31 is opened.

Figure 3:
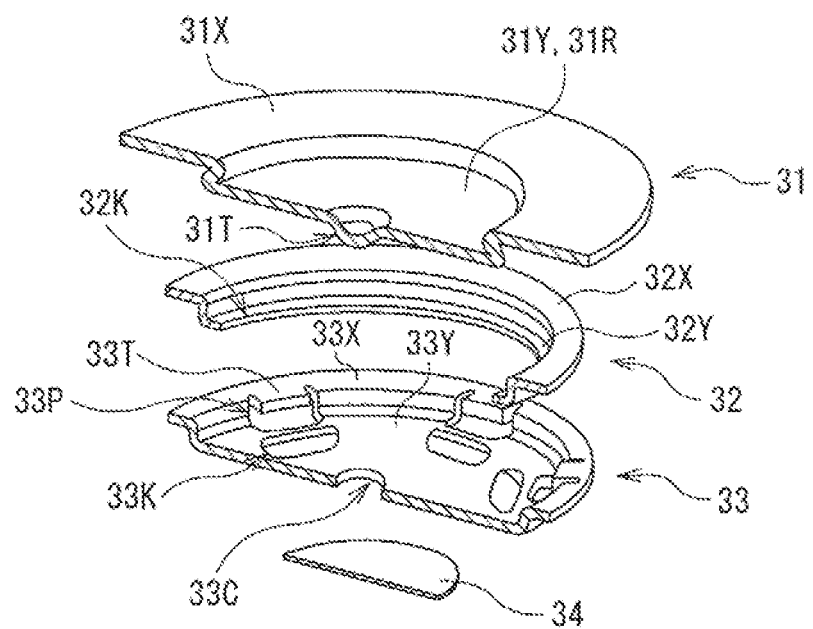
FIG. 3 is a perspective cross-sectional view illustrating a configuration of a main part of a safety valve mechanism illustrated in FIG. 2 according to an embodiment of the present technology.

FIG. 3 illustrates the configuration of the perspective cross-section of each of main parts (the safety cover 31, a disk holder 32, a stripper disk 33, and a sub-disk 34) of the safety valve mechanism 30 illustrated in FIG. 2. In this regard, FIG. 3 illustrates a state in which the safety cover 31, the disk holder 32, the stripper disk 33, and the sub-disk 34 are cut along line A-A illustrated in FIG. 2.

Figure 5:
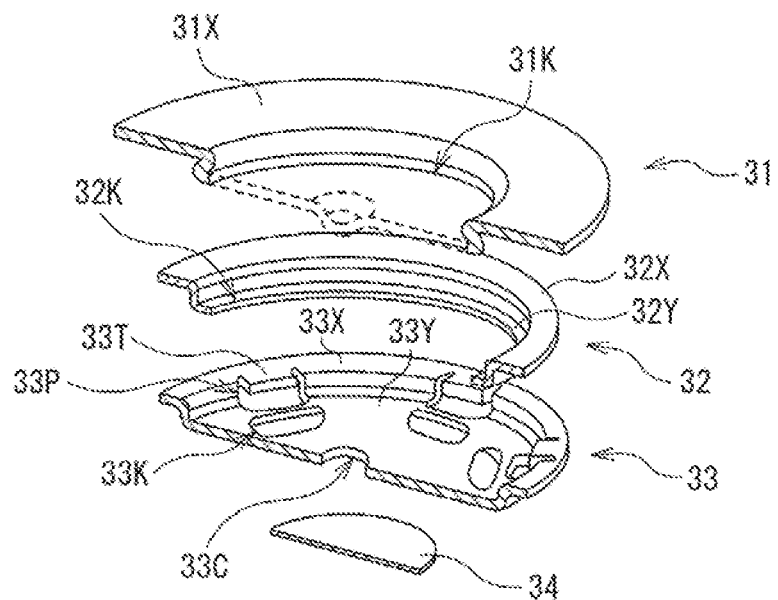
FIG. 5 is a perspective cross-sectional view illustrating a configuration of a main part of the safety valve mechanism illustrated in FIG. 4 according to an embodiment of the present technology.

FIG. 5 illustrates the configuration of the perspective cross-section of each of the main parts (the safety cover 31, the disk holder 32, the stripper disk 33, and the sub-disk 34) of the safety valve mechanism 30 illustrated in FIG. 4, and corresponds to FIG. 3.

In each of FIGS. 3 and 5, in order to make the configuration of the perspective cross-section of each of the safety cover 21, the disk cover 33, the stripper disk 34, and the sub-disk 35 easily viewable, these are illustrated in a state spaced apart from one another.

As illustrated in FIGS. 2 and 3, for example, the safety valve mechanism 30 includes the safety cover 31, the disk holder 32, the stripper disk 33, and the sub-disk 34. The safety cover 31 is a "valve member" according to an embodiment of the present technology, and the stripper disk 33 is an "opening member" according to an embodiment of the present technology.

The safety cover 31, the disk holder 32, the stripper disk 33, and the sub-disk 34 are arranged, for example, in this order from the side farther from the wound electrode body 20 (the side closer to the battery cover 14).

The safety cover 31 is a member that can be partially opened in response to an increase in internal pressure of the battery can 11 or the like. The internal pressure of the battery can 11 increases due to a side reaction such as a decomposition reaction of the electrolytic solution. More specifically, when a side reaction such as a decomposition reaction of the electrolytic solution occurs, gas such as carbon dioxide is generated inside the battery can 11, whereby the internal pressure of the battery can 11 increases in response to an increase in the amount of gas generated.

The planar shape of the safety cover 31 is not particularly limited, and it is, for example, a substantially circular shape as illustrated in FIGS. 2 and 3. The "substantially circular shape" means a true circle, an ellipse, a shape similar to other circles or the like.

The central area of the safety cover 31 is recessed toward, for example, the disk holder 32. Therefore, the safety cover 31 includes, for example, a ring-shaped outer peripheral portion 31X and a central portion 31Y surrounded by the outer peripheral portion 31X. The planar shape of the central portion 31Y is not particularly limited, and is, for example, a substantially circular shape. Since the surface of the central portion 31Y is lower than the surface of the outer peripheral portion 31X, the central portion 31Y is closer to, for example, the disk holder 32 than the outer peripheral portion 31X.

As described above, the central portion 31Y has an opening valve portion 31R that can be opened in response to an increase in internal pressure of the battery can 11 or the like. More specifically, for example, when the internal pressure of the battery can 11 increases to a certain level or more, the opening valve portion 31R provided in the central portion 31Y is cleaved or removed, whereby an opening portion 31K is formed at a position where the valve portion 31R is cleaved or removed as illustrated in FIGS. 4 and 5. The opening valve portion 31R is opened, whereby the safety cover 31 is opened as described above. The configuration of the opening valve portion 31R will be described later (see FIGS. 6 to 9).

The central area of the central portion 31Y is recessed further toward, for example, the disk holder 32. Therefore, for example, a protrusion portion 31T partially protruding toward the disk holder 32 is provided in the central portion 31Y.

The safety cover 31 includes, for example, any one of, or two or more of metal materials such as aluminum and an aluminum alloy.

The size of the safety cover 31 is not particularly limited. More specifically, for example, when the planar shape of the safety cover 31 is a substantially circular shape and the planar shape of the central portion 31Y is a substantially circular shape, the diameter of the safety cover 31 is from about 12 mm to 25 mm and the diameter of the central portion 31Y is from about 4 mm to 12 mm.

The disk holder 32 is a member which is mainly interposed between the safety cover 31 and the stripper disk 33 so as to align the stripper disc 33 with the safety cover 31.

The planar shape of the disk holder 32 is not particularly limited, and is, for example, a substantially circular shape as illustrated in FIGS. 2 and 3.

The central area of the disk holder 32 is recessed toward, for example, the stripper disk 33. Therefore, the disk holder 32 includes, for example, a ring-shaped outer peripheral portion 32X and a central portion 32Y surrounded by the outer peripheral portion 32X. The planar shape of the central portion 32Y is not particularly limited, and is, for example, a substantially circular shape. Since the surface of the central portion 32Y is lower than the surface of the outer peripheral portion 32X, the central portion 32Y is closer to, for example, the stripper disk 33 than the outer peripheral portion 32X.

The central portion 31Y of the safety cover 31 is fitted, for example, in a recess provided in the disk holder 32. As a result, the safety cover 31 is aligned with the disk holder 32, and the safety cover 31 is fixed to the disk holder 32.

In the central portion 32Y, for example, an opening portion 32K is provided at a position corresponding to the central portion 31Y (the opening valve portion 31R) of the safety cover 31. The opening shape of the opening portion 32K is not particularly limited, and is, for example, a substantially circular shape.

The disk holder 32 contains any one of, or two or more of polymer materials such as polypropylene (PP) and polybutylene terephthalate (PBT).

The size of the disk holder 32 is not particularly limited. More specifically, for example, when the planar shape of the disk holder 32 is a substantially circular shape and the opening shape of the opening portion 32K is a circular shape, the diameter of the disk holder 32 is from about 9 mm to 17 mm and the diameter of the opening portion 32K is from about 7 m to 12 mm.

The stripper disk 33 is a member which mainly discharges gas generated inside the battery can 11.

The planar shape of the stripper disk 33 is not particularly limited, and is, for example, a substantially circular shape as illustrated in FIGS. 2 and 3.

The central area of the stripper disk 33 is recessed toward, example, the sub-disk 34. Therefore, the stripper disk 33 includes, for example, a ring-shaped outer peripheral portion 33X and a central portion 33Y surrounded by the outer peripheral portion 33X. The planar shape of the central portion 33Y is not particularly limited, and is, for example, a substantially circular shape. Since the surface of the central portion 33Y is lower than, for example, the surface of the outer peripheral portion 33X, the central portion 33Y is closer to, for example, the sub-disk 34 than the outer peripheral portion 33X.

The central portion 32Y of the disk holder 32 is fitted, for example, in a recess provided in the stripper disk 33. As a result, the stripper disk 33 is aligned with the disk holder 32, and the stripper disk 33 is fixed to the disk holder 32.

In the central portion 33Y, a plurality of opening portions 33K is provided in a region opposed to the opening valve portion 31R. The plurality of opening portions 33K is mainly a ventilation hole for discharging gas generated inside the battery can 11 to the outside.

A plurality of protrusion portions 33T protruding toward the plurality of opening portions 33K is provided in the outer peripheral portion 33X, and the plurality of protrusion portions 33T is arranged in a region outside the plurality of opening portions 33K. The plurality of protrusion portions 33T is mainly used for fixing the stripper disk 33 to the disk holder 32. In this case, for example, as illustrated in FIGS. 2 and 4, the plurality of protrusion portions 33T is pressed against the outer surface of the disk holder 32, whereby the inner surface of the disk holder 32 is pressed against the safety cover 31. As a result, a fitting force is generated between a part of the stripper disk 33 (the plurality of protrusion portions 33T) and the safety cover 31 with the disk holder 32 interposed therebetween, whereby the fitting force is used to fix the stripper disk 33 to the disk holder 32.

In this case, for example, the stripper disk 33 is partially removed so as to leave a part of the outer peripheral portion 33X in the range from the outer peripheral portion 33X to the central portion 33Y. For this reason, opening portions 33P are provided at positions where the stripper disk 33 is partially removed, and the protrusion portions 33T are formed at the remaining portions of the outer peripheral portion 33X.

In the central portion 33Y, for example, an opening portion 33C is provided in a position of the safety cover 31 corresponding to the protrusion portion 31T. The protrusion portion 31T protrudes through the opening portion 33C to come into contact with the sub-disk 34. The opening shape of the opening portion 33C is not particularly limited, and is, for example, a substantially circular shape.

The stripper disk 33 includes, for example, any one of, or two or more of metal materials such as aluminum and an aluminum alloy. However, the material for forming the stripper disk 33 may be the same as the material for forming the safety cover 31, or may be different from the material for forming the safety cover 31.

The size of the stripper disk 33 is not particularly limited. More specifically, for example, when the planar shape of the stripper disk 33 is a substantially circular shape and the planar shape of the central portion 33Y is a substantially circular shape, the diameter of the stripper disk 33 is from about 9 mm to 17 mm and the diameter of the central portion 33Y is from about 8 mm to 14 mm.

The detailed configuration of the stripper disk 33 having the plurality of protrusion portions 33T and the plurality of opening portions 33K will be described later (see FIGS. 10 to 12).

The sub-disk 34 is a member which is interposed between the safety cover 31 and the positive electrode lead 25 so as to electrically connect the safety cover 31 (the protrusion portion 31T) to the positive electrode lead 25.

The planar shape of the sub-disk 34 is not particularly limited, and is, for example, a substantially circular shape as illustrated in FIGS. 2 and 3.

The sub-disk 34 includes, for example, any one of, or two or more of metal materials such as aluminum and an aluminum alloy. However, the material for forming the sub-disk 34 may be the same as the material for forming the safety cover 31, or may be different from the material for forming the safety cover 31.

The size of the sub-disk 34 is not particularly limited. Specifically, for example, when the planar shape of the sub-disk 34 is a substantially circular shape, the diameter of the sub-disk 34 is from about 5 mm to 7 mm.

Subsequently, the configuration of the safety cover 31 (the opening valve portion 31R) will be described.

Figure 6:
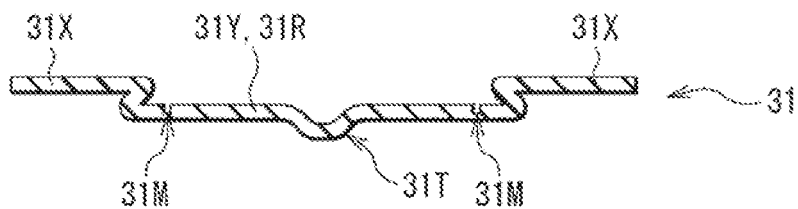
FIG. 6 is a cross-sectional view illustrating a configuration of a safety cover (in a state before the safety cover is opened) according to an embodiment of the present technology.
Figure 7:
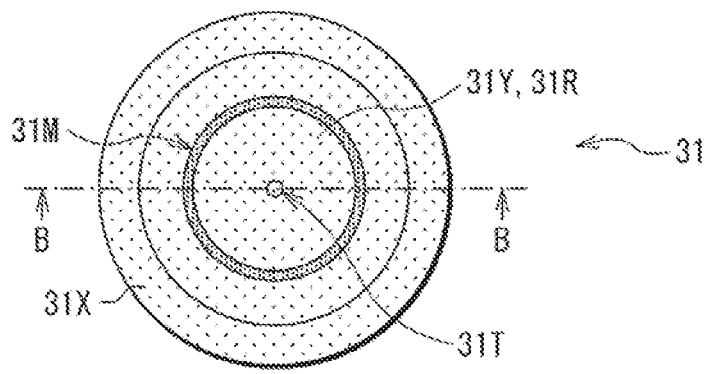
FIG. 7 is a plan view illustrating the configuration of the safety cover illustrated in FIG. 6 according to an embodiment of the present technology.
Figure 8:
FIG. 8 is a cross-sectional view illustrating a configuration of the safety cover (in a state after the safety cover is opened) according to an embodiment of the present technology.
Figure 9:
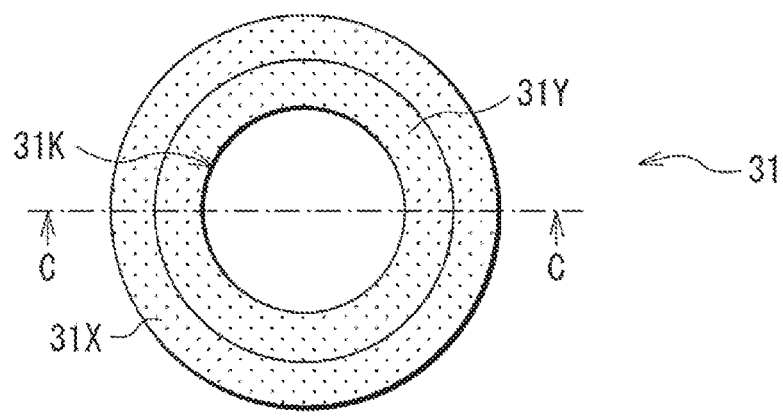
FIG. 9 is a plan view illustrating the configuration of the safety cover illustrated in FIG. 8 according to an embodiment of the present technology.

FIGS. 6 and 8 each illustrate the configuration of the cross-section of the safety cover 31, and FIGS. 7 and 9 each illustrate a plane view of the configuration of the safety cover 31.

FIGS. 6 and 7 each illustrate a state before the safety cover 31 is opened, and FIG. 6 illustrates the cross-section of the safety cover 31 along line B-B illustrated in FIG. 7.

FIGS. 8 and 9 each illustrate a state after the safety cover 31 is opened, and FIG. 8 illustrates the cross-section of the safety cover 31 along line C-C illustrated in FIG. 9.

For example, as illustrated in FIGS. 6 and 7, the safety cover 31 includes the outer peripheral portion 31X and the central portion 31Y provided with the protrusion portion 31T. In the central portion 31Y, for example, a groove 31M for defining the opening valve portion 31R is provided. That is, the opening valve portion 31R is, for example, a portion surrounded by the groove 31M in the central portion 31Y. In FIG. 7, the safety cover 31 is lightly shaded, and the groove 31M is darkly shaded.

The planar shape of the groove 31M is not particularly limited, and is, for example, a substantially circular ring shape. The width and depth of the groove M can be arbitrarily set.

When the internal pressure of the battery can 11 increases, for example, the central portion 31Y is cut along the groove 31M, the portion surrounded by the groove 31M in the central portion 31Y is removed, and the opening valve portion 31R is opened. Therefore, for example, as illustrated in FIGS. 8 and 9, the opening portion 31K is formed, and thus the safety cover 31 is opened. The opening shape of the opening portion 31K is not particularly limited, and is, for example, a substantially circular shape.

Subsequently, the detailed configuration of the stripper disk 33 will be described.

Figure 10:
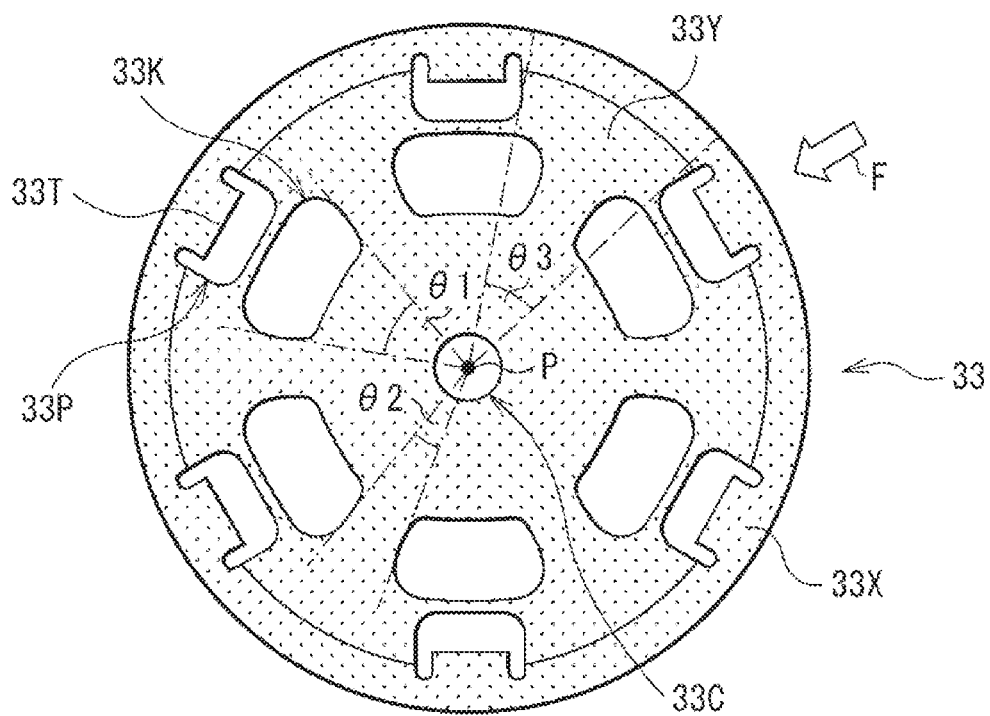
FIG. 10 is a plan view illustrating a configuration of a stripper disk according to an embodiment of the present technology.
Figure 11:
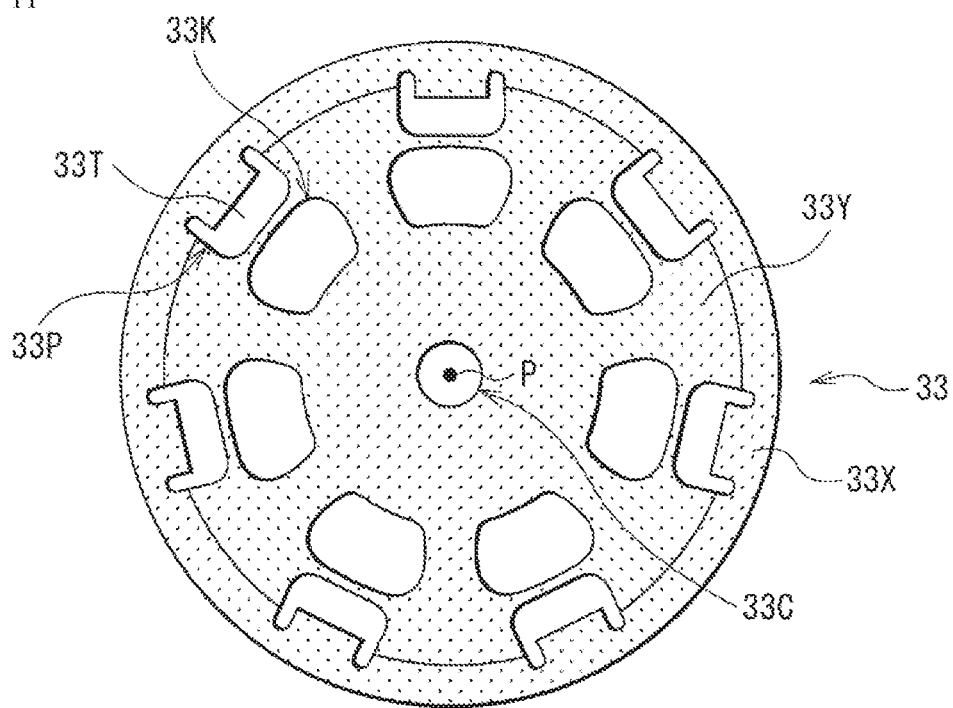
FIG. 11 is a plan view illustrating a configuration of a stripper disk according to an embodiment of the present technology.
Figure 12:
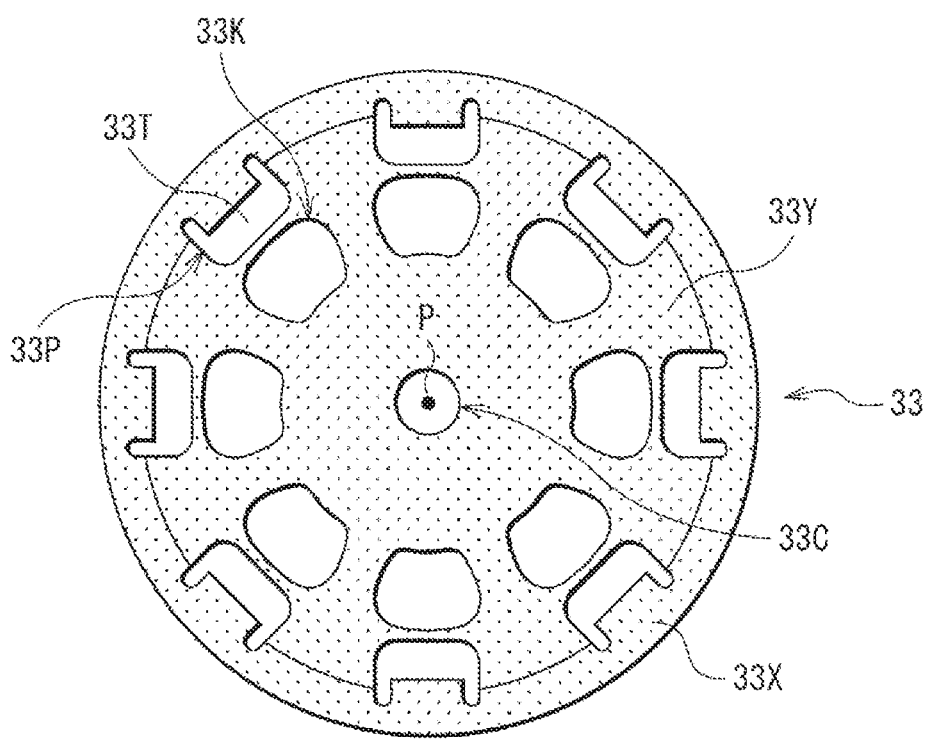
FIG. 12 is a plan view illustrating a configuration of a stripper disk according to an embodiment of the present technology.

FIGS. 10 to 12 each illustrate the planar shape of the stripper disk 33. In each of FIGS. 10 to 12, the surface of the stripper disk 33 is shaded.

As described above, in the stripper disk 33, the plurality of opening portions 33K is provided in the central portion 33Y, and the plurality of protrusion portions 33T is provided outside the plurality of opening portions 33K.

In the region corresponding to the opening valve portion 31R provided in the safety cover 31, the plurality of opening portions 33K is radially arranged from a center of the region (a center P of the stripper disk 33) as a base point. In other words, the plurality of opening portions 33K is arranged with a predetermined interval (a non-opening angle θ2) in a direction along an outer edge of the stripper disk 33.

The opening shape of each of the opening portions 33K is not particularly limited, and is, for example, a trapezoidal shape with four round corners. In this trapezoidal shape, for example, a length of an upper base positioned on the side far from the center P of the stripper disk 33 is larger than a length of a lower base positioned on the side close to the center P.

The opening shapes of the plurality of opening portions 33K may be the same as one another, or may be different from one another. Of course, the opening shapes of some of the plurality of opening portions 33K may be the same. FIGS. 10 to 12 illustrate, for example, the case where the opening shapes of the plurality of opening portions 33K are the same.

The non-opening angle θ2 is an angle set with the center P of the stripper disk 33 as a base point in order to define a distance (interval) between the two adjacent opening portions 33K. The non-opening angle θ2 can be arbitrarily set according to conditions such as the number of the opening portions 33K.

As is clear from FIGS. 10 to 12, in the case of focusing attention on the two adjacent opening portions 33K in the arrangement direction of the plurality of opening portions 33K, the non-opening angle θ2 is an angle determined by a line segment (imaginary line) which passes through the center P of the stripper disk 33 and is in contact with an end of one of the opening portions 33K and a line segment (imaginary line) which passes through the center P of the stripper disk 33 and is in contact with an end of the other opening portion 33K. The fact that the non-opening angle θ2 is large means that the two adjacent opening portions 33K are relatively separated from each other, and the fact that the non-opening angle θ2 is small means that the two adjacent opening portions 33K are relatively close to each other.

The width of each of the opening portions 33K is represented by an opening angle θ1. The opening angle θ1 is an angle set with the center P of the stripper disk 33 as a base point in order to define the width of each of the opening portions 33K. The opening angle θ1 can be arbitrarily set according to conditions such as the number of the opening portions 33K.

As is clear from FIGS. 10 to 12, in the case of focusing attention on an opening portion 33K, the opening angle θ1 is an angle determined by a line segment (imaginary line) which passes through the center P of the stripper disk 33 and is in contact with one end of the opening portion 33K and a line segment (imaginary line) which passes through the center P of the stripper disk 33 and is in contact with the other end of the opening portion 33K. The fact that the opening angle θ1 is large means that the width of the opening portion 33K is relatively large, and the fact that the opening angle θ1 is small means that the width of the opening portion 33K is relatively small.

Similarly to the plurality of opening portions 33K, the plurality of protrusion portions 33T is radially arranged from the center P of the stripper disk 33 as a base point. In other words, the plurality of protrusion portions 33T is arranged with a predetermined interval (a non-opening angle θ3) in a direction along an outer edge of the stripper disk 33.

The planar shape of each of the protrusion portions 33T is not particularly limited, and is, for example, a rectangular shape.

The planar shapes of the plurality of protrusion portions 33T may be the same as one another or may be different from one another. Of course, the planar shapes of some of the plurality of protrusion portions 33T may be the same. FIGS. 10 to 12 illustrate, for example, the case where the planar shapes of the plurality of protrusion portions T are the same.

The non-opening angle θ3 is an angle set with the center P of the stripper disk 33 as a base point in order to define a distance (interval) between the two adjacent protrusion portions 33T. The non-opening angle θ3 can be arbitrarily set according to conditions such as the number of the protrusion portions 33T.

As is clear from FIGS. 10 to 12, in the case of focusing attention on the two adjacent protrusion portions 33T in the arrangement direction of the plurality of protrusion portions 33T, the non-opening angle θ3 is an angle determined by a line segment (imaginary line) which passes through the center P of the stripper disk 33 and is in contact with an end of one of the protrusion portions 33T and a line segment (imaginary line) which passes through the center P of the stripper disk 33 and is in contact with an end of the other protrusion portion 33T. The fact that the non-opening angle θ3 is large means that the two adjacent protrusion portions 33T are relatively separated from each other, and the fact that the non-opening angle θ3 is small means that the two adjacent protrusion portions 33T are relatively close to each other.

Here, the number of the opening portions 33K, the number of the protrusion portions, and the positional relationship between the plurality of opening portions 33K and the plurality of protrusion portions 33T satisfy the following two conditions.

Firstly, the number of the opening portions 33K and the number of the protrusion portions 33T are the same. Secondly, each of the plurality of opening portions 33K and each of the plurality of protrusion portions 33T are opposed to each other in a direction toward the center P of the stripper disk 33. For example, when the planar shape of the stripper disk 33 is a substantially circular shape, the direction toward the center P of the stripper disk 33 is a radial direction of the stripper disk 33.

The reason why the two conditions are satisfied is that the physical strength of the stripper disk 33 is secured and the gas generated inside the battery can 11 is sufficiently discharged to the outside through the plurality of opening portions 33K, as compared with the case where the two conditions are not satisfied. Thus, even if gas is generated inside the battery can 11, a sufficient amount of gas is stably released to the outside of the battery can 11.

Particularly, when the two conditions are satisfied, the physical strength of the stripper disk 33 in a direction orthogonal to the paper surface of each of FIGS. 10 to 12 is improved. Thus, even if an external force is applied from the direction, the stripper disk 33 is less likely to be deformed and damaged.

Figure 14:
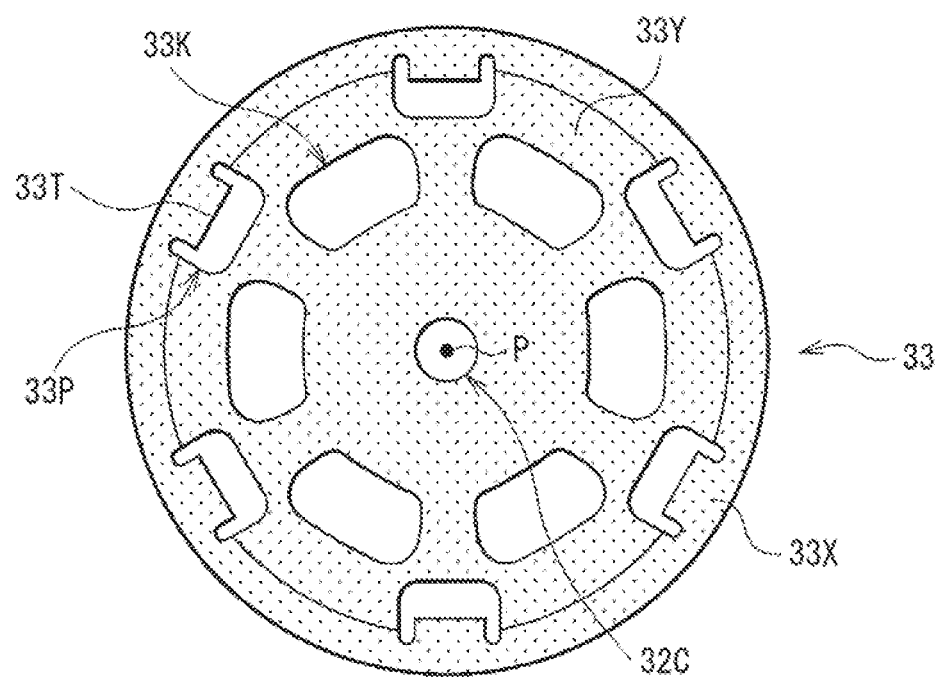
FIG. 14 is a plan view illustrating a configuration of a stripper disk of a comparative example according to an embodiment of the present technology.

Specifically, when each of the plurality of opening portions 33K and each of the plurality of protrusion portions 33T are not opposed to each other in the direction toward the center P, for example, as illustrated in FIG. 14 to be described later, a width of a portion (a connecting portion) connecting a central portion (a portion surrounded by the plurality of opening portions 33K) of the stripper disk 33 to an outer peripheral portion (the outer peripheral portion 33X) is narrow. Accordingly, the physical strength of the stripper disk 33 against the external force is insufficient. The reason why the width of the connecting portion becomes narrow as described above is that the opening portion 33K is present between the central portion and the outer peripheral portion, and thus the effective width of the connecting portion is smaller than the actual width.

On the other hand, when each of the plurality of opening portions 33K and each of the plurality of protrusion portions 33T are opposed to each other in the direction toward the center P, for example, as illustrated in FIG. 10, the width of the connecting portion is increased and thus the physical strength of the stripper disk 33 against the external force is secured. The reason why the width of the connecting portion is increased as described above is that the opening portion 33K is not present between the central portion and the outer peripheral portion, and thus the effective width of the connecting portion is equal to the actual width.

Consequently, when the two conditions are satisfied, the stripper disk 33 is maintained without being deformed and damaged even if it receives the internal pressure of the battery can 11 as the external force, whereby the gas releasing function of the stripper disk 33 using the plurality of opening portions 33K is also maintained. Therefore, as described above, the gas generated inside the battery can 11 is sufficiently and stably released to the outside.

The fact that each of the plurality of opening portions 33K and each of the plurality of protrusion portions 33T are opposed to each other means the following positional relationship.

As is clear from FIGS. 10 to 12, in the case of focusing attention on any one of the plurality of protrusion portions 33T, an opening portion 33K is arranged along the direction toward the center P of the stripper disk 33 from the protrusion portion 33T, and thus the protrusion portion 33T and the opening portion 33K substantially face to each other. In the direction toward the center P of the stripper disk 33, the center position of each of the opening portions 33K in the arrangement direction of the plurality of opening portions 33K and the center position of each of the protrusion portions 33T in the arrangement direction of the plurality of protrusion portions 33T substantially coincide with each other. These positional relationships are established for all of the plurality of opening portions 33K and all of the plurality of protrusion portions 33T.

In other words, as described above, the plurality of opening portions 33K is arranged in a direction along the outer edge of the stripper disk 33, and the plurality of protrusion portions 33T is similarly arranged in the direction along the outer edge of the stripper disk 33. Thus, the phase relating to the arrangement of the plurality of opening portions 33K and the phase relating to the arrangement of the plurality of protrusion portions 33T substantially coincide with each other.

The term "substantially face" means not only that, in the positional relationship between the opening portion 33K and the protrusion portion 33T, the opening portion 33K completely (exactly) faces to the protrusion portion 33T, but also that the possibility of an error during the production process of the stripper disk 33 in the facing relationship is allowed. In other words, as a result of producing the stripper disk 33 in order to allow the opening portion 33K to face to the protrusion portion 33T, the center position of the opening portion 33K and the center position of the protrusion portion 33T may be slightly displaced from each other due to the error during the production.

The explanation on the term "substantially face" is similarly applied to the term "substantially coincide". In other words, as a result of producing the stripper disk 33 in order to allow the phase relating to the arrangement of the plurality of opening portions 33K and the phase relating to the arrangement of the plurality of protrusion portions 33T to coincide with each other, the phase relating to the arrangement of the plurality of opening portions 33K and the phase relating to the arrangement of the plurality of protrusion portions 33T may be slightly displaced from each other due to the error during the production.

As long as the two conditions are satisfied, the number of the opening portions 33K and the number of the protrusion portions 33T are not particularly limited. That is, the number of the opening portions 33K may be only 1, or may be 2 or more. Similarly, the number of the protrusion portions 33T may be only 1, or may be 2 or more.

In particular, for example, as illustrated in FIGS. 10 to 12, the number of the opening portions 33K is preferably from 6 to 8, and the number of the protrusion portions 33T is preferably from 6 to 8. Since the relationship between the number of the opening portions 33K and the number of the protrusion portions 33T is optimized, the physical strength of the stripper disk 33 is further improved while securing the gas discharging efficiency using the plurality of opening portions 33K.

Specifically, when the number of the plurality of opening portions 33K is less than 6, there is a possibility that the physical strength of the stripper disk 33 is lowered, for the reasons described below.

As is clear from FIGS. 10 to 12, in the case where the opening ratio to be described later is set to a certain level, the width (the opening angle θ1) of the opening portion 33K tends to increase as the number of the opening portions 33K decreases. In such a situation, as illustrated in FIG. 10, when an external force F toward the center P is supplied to the stripper disk 33 via any of the protrusion portions 33T and the opening portion 33K opposed to the protrusion portion 33T, the stripper disk 33 may be deformed and damaged due to the external force F.

In this case, when the number of the opening portions 33K is less than 6, the width (the opening angle θ1) of the opening portion 33K is excessively increased, whereby the stripper disk 33 tends to warp significantly due to the external force F. Therefore, depending on the magnitude of the external force F, the stripper disk 33 may be distorted, and the stripper disk 33 may be damaged.

On the other hand, when the number of the plurality of opening portions 33K is 6 or more, the width (the opening angle θ1) of the opening portion 33K is appropriately reduced, whereby the stripper disk 33 is less likely to warp even if the external force F is supplied. Therefore, the stripper disk 33 is less likely to be distorted, and the stripper disk 33 is less likely to be damaged.

Further, when the number of the opening portions 33K is greater than 8, as is clear from the relationship between the number of the opening portions 33K and the width (the opening angle θ1), the number of the opening portions 33K is too large and thus the width of the opening portion 33K becomes significantly narrow. In this case, the gas generated inside the battery can 11 is less likely to be discharged to the outside through the plurality of opening portions 33K, whereby the gas discharging efficiency using the plurality of opening portions 33K may be reduced.

On the other hand, when the number of the plurality of opening portions 33K is 8 or less, the number of the plurality of opening portions 33K is appropriately reduced, whereby the width of the opening portion 33K is sufficiently increased. As a result, the gas generated inside the battery can 11 is likely to be discharged to the outside through the plurality of opening portions 33K, so that the gas discharging efficiency using the plurality of opening portions 33K is improved.

FIG. 10 illustrates a case in which the number of the opening portions 33K is 6 and the number of the protrusion portions 33T is 6. FIG. 11 illustrates a case in which the number of the opening portions 33K is 7 and the number of the protrusion portions 33T is 7. FIG. 12 illustrates a case in which the number of the opening portions 33K is 8 and the number of the protrusion portions 33T is 8.

As long as the two conditions are satisfied, the opening ratio defined by the opening valve portion 31R and the plurality of opening portions 33K is not particularly limited.

This opening ratio is calculated by the following equation (1). In other words, P1 is a total opening area of the plurality of opening portions 33K. In other words, P2 is an opening area of the opening portion 31K. For example, when the opening shape of the opening portion 31K is a substantially circular shape (a diameter D), the opening area of the opening portion 31K is calculated by the equation: opening area=$(D/2)_2×π$. That is, the opening ratio is a ratio (percentage) of the total opening area of the plurality of opening portions 33K to the area of the opening portion 31K.

$$\text{Opening ratio (\%)} = (P1/P2) \times 100 \qquad (1)$$

(P1 is a sum of opening areas of the opening portions. P2 is an area of the opening valve portion.)

In particular, the opening ratio is preferably from 20% to 60%. This is because the relationship between the area of the opening valve portion 31R (the opening area of the opening portion 31K) and the sum of the opening areas of the opening portions 33K (the total opening area of the plurality of opening portions 33K) is optimized, so that the gas discharging efficiency using the plurality of opening portions 33K is improved.

Subsequently, the configuration of the wound electrode body 20 will be described.

Figure 13:
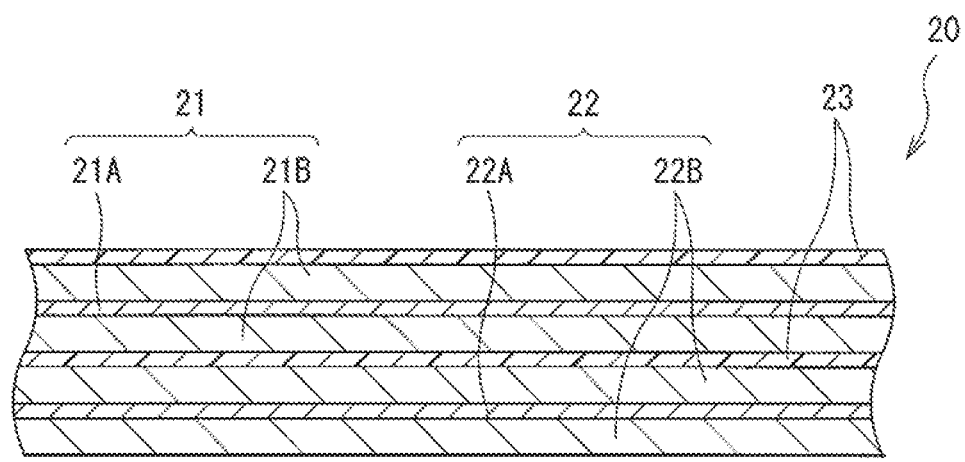
FIG. 13 is an enlarged cross-sectional view illustrating a part of a configuration of a wound electrode body illustrated in FIG. 1 according to an embodiment of the present technology.

FIG. 13 enlargedly illustrates the configuration of the cross-section of a part of the wound electrode body 20 illustrated in FIG. 1. As described above, the wound electrode body 20 includes the positive electrode 21, the negative electrode 22, and the electrolytic solution.

For example, as illustrated in FIG. 13, the positive electrode 21 includes a positive electrode current collector 21A and a positive electrode active material layer 21B provided on both sides of the positive electrode current collector 21A. However, the positive electrode active material layer 21B may be provided only on one side of the positive electrode current collector 21A.

The positive electrode current collector 21A includes, for example, any one of, or two or more of conductive materials. The types of the conductive materials are not particularly limited, and are, for example, metal materials such as aluminum, nickel, and stainless. The positive electrode current collector 21A may be a single layer or a multilayer.

The positive electrode active material layer 21B includes, as a positive electrode active material, any one of, or two or more of positive electrode materials capable of occluding and releasing lithium. However, the positive electrode active material layer 21B may further include any one of, or two or more of other materials such as a positive electrode binder and a positive electrode conductive agent.

The positive electrode material is preferably a lithium-containing compound, and more specifically, it is preferably one or both of a lithium-containing composite oxide and a lithium-containing phosphate compound. This is because a high energy density is obtained.

The lithium-containing composite oxide is an oxide containing lithium and one or two or more other elements (elements other than lithium) as constituent elements, and has, for example, a layered rock salt-type crystal structure or a spinel-type crystal structure. The lithium-containing phosphate compound is a phosphate compound containing lithium and one or two or more other elements as constituent elements, and has, for example, an olivine-type crystal structure.

The types of the other elements are not particularly limited as long as the elements correspond to any one of, or two or more of optional elements. Above all, the other elements preferably correspond to any one of, or two or more of the elements that belong to Groups 2 to 15 in the long-periodic table. More specifically, the other elements more preferably include any one of, or two or more of metal elements of nickel (Ni), cobalt (Co), manganese (Mn), and iron (Fe). This is because a high voltage is achieved.

The lithium-containing composite oxide having a layered rock salt-type crystal structure is, for example, a compound represented by each of the following formulas (21) to (23).

$$Li_aMn_{(1-b-c)}Ni_bM11_cO_{(2-d)}F_e \quad (21)$$

(M11 represents at least one of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W). a to e satisfy $0.8 \leq a \leq 1.2$, $0<b<0.5$, $0 \leq c \leq 0.5$, $(b+c)<1$, $-0.1 \leq d \leq 0.2$, and $0 \leq e \leq 0.1$. However, the lithium composition varies depending on the charged/discharged state, and a refers to the value in a fully discharged state.)

$$Li_aNi_{(1-b)}M12_bO_{(2-c)}F_d \quad (22)$$

(M12 represents at least one of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.8 \leq a \leq 1.2$, $0.005 \leq b \leq 0.5$, $-0.1 \leq c \leq 0.2$, and $0 \leq d \leq 0.1$. However, the lithium composition varies depending on the charged/discharged state, and a refers to the value in a fully discharged state.)

$$Li_aCo_{(1-b)}M13_bO_{(2-c)}F_d \quad (23)$$

(M13 represents at least one of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.8 \leq a \leq 1.2$, $0 \leq b<0.5$, $-0.1 \leq c \leq 0.2$, and $0 \leq d \leq 0.1$. However, the lithium composition varies depending on the charged/discharged state, and a refers to the value in a fully discharged state.)

Specific examples of the lithium-containing composite oxide having a layered rock salt-type crystal structure include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$ When the lithium-containing composite oxide that has a layered rock salt-type crystal structure contains nickel, cobalt, manganese, and aluminum as constituent elements, the atomic ratio of the nickel is preferably 50 atomic % or more. This is because a high energy density is obtained.

The lithium-containing composite oxide that has a spinel-type crystal structure may be, for example, a compound represented by the following formula (24).

$$Li_aMn_{(2-b)}M14_bO_cF_d \quad (24)$$

(M14 represents at least one of cobalt (Co), Nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.9 \leq a \leq 1.1$, $0 \leq b \leq 0.6$, $3.7 \leq c \leq 4.1$, and $0 \leq d \leq 0.1$. However, the lithium composition varies depending on the charged/discharged state, and a refers to the value in a fully discharged state.)

The lithium-containing composite oxide that has a spinel-type crystal structure is, for example, $LiMn_2O_4$.

The lithium-containing phosphate compound that has an olivine-type crystal structure is, for example, a compound represented by the following formula (25).

$$Li_aM15PO_4 \quad (25)$$

(M15 represents at least one of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). a satisfies $0.9 \leq a \leq 1.1$. However, the lithium composition varies depending on the charged/discharged state, and a refers to the value in a fully discharged state.)

Specific examples of the lithium-containing phosphate compound that has an olivine-type crystal structure include $LiFePO_4$, $LiMnPO_4$, $LiFe_{0.5}Mn_{0.5}PO_4$, and $LiFe_{0.3}Mn_{0.7}PO_4$ The lithium-containing composite oxide may be a compound represented by the following formula (26), or the like.

$$(Li_2MnO_3)_x(LiMnO_2)_{1-x} \quad (26)$$

(x satisfies $0 \leq x \leq 1$. However, the lithium composition varies depending on the charged/discharged condition, and x refers to the value in a fully discharged state.)

Besides, the positive electrode material may be, for example, any one of, or two or more of oxides, disulfides, chalcogenides, and conductive polymers. The oxides are, for example, a titanium oxide, a vanadium oxide or a manganese dioxide. The disulfides are, for example, a titanium disulfide or a molybdenum sulfide.

The chalcogenides are, for example, a niobium selenide. The conductive polymers are, for example, sulfur, polyaniline or polythiophene. However, the positive electrode material may be other materials than the above-described materials.

The positive electrode binder includes any one of, or two or more of synthetic rubbers and polymer compounds, for example. The synthetic rubbers are, for example, styrene-butadiene rubbers, fluorine rubbers or ethylene propylene diene. The polymer compounds are, for example, polyvinylidene fluoride or polyimide.

The positive electrode conductive agent includes, for example, any one of, or two or more of carbon materials. The carbon materials are, for example, graphite, carbon black, acetylene black or ketjen black. However, the positive electrode conductive agent may be a metal material, a conductive polymer, or the like as long as the agent is a conductive material.

For example, as illustrated in FIG. 13, the negative electrode 22 includes a negative electrode current collector 22A and a negative electrode active material layer 22B provided on both sides of the negative electrode current collector 22A.

However, the negative electrode active material layer 22B may be provided only on one side of the negative electrode current collector 22A.

The negative electrode current collector 22A includes, for example, any one of, or two or more of conductive materials. The types of the conductive materials are not particularly limited, and are for example, metal materials such as copper, aluminum, nickel, and stainless. The negative electrode current collector 22A may be a single layer or a multilayer.

The surface of the negative electrode current collector 22A is preferably roughened. This is because the adhesion of the negative electrode active material layer 22B to the negative electrode current collector 22A is improved due to a so-called anchor effect. In this case, the surface of the negative electrode current collector 22A has only to be roughened at least in a region opposed to the negative electrode active material layer 22B. The roughening method is, for example, a method of forming fine particles through the use of electrolytic treatment. The electrolytic treatment provides the surface of the negative electrode current collector 22A with irregularities, because fine particles are formed on the surface of the negative electrode current collector 22A with an electrolytic method in an electrolytic cell. Copper foil prepared by the electrolytic method is generally referred to as electrolytic copper foil.

The negative electrode active material layer 22B includes, as a negative electrode active material, any one of, or two or more of negative electrode materials capable of occluding and releasing lithium. However, the negative electrode active material layer 22B may further include any one of, or two or more of other materials such as a negative electrode binder and a negative electrode conductive agent.

The chargeable capacity of the negative electrode material is preferably higher than the discharged capacity of the positive electrode 21 in order to prevent lithium metal from being unintentionally deposited on the surface of the negative electrode 22 in the process of charging. In other words, the electrochemical equivalent of the negative electrode material capable of occluding and releasing lithium is preferably larger than the electrochemical equivalent of the positive electrode 21.

The negative electrode material is, for example, any one of, or two or more of carbon materials. This is because a change in the crystal structure during occluding and releasing of lithium is extremely small so that a high energy density can be stably obtained. In addition, this is because the carbon materials also function as negative electrode conductive agents, thus improving the conductivity of the negative electrode active material layer 22B.

Examples of the carbon materials include graphitizable carbon, non-graphitizable carbon, and graphite. However, the interplanar spacing of the (002) plane in the non-graphitizable carbon is preferably 0.37 nm or more, and the interplanar spacing of the (002) plane in the graphite is preferably 0.34 nm or less. More specific examples of the carbon materials include pyrolytic carbons, cokes, glassy carbon fibers, organic polymer compound fired bodies, activated carbon, and carbon black. The cokes include pitch cokes, needle cokes, and petroleum cokes. The organic polymer compound fired body is a substance in which a polymer compound such as a phenol resin or a furan resin is fired (carbonized) at an appropriate temperature. Besides, the carbon materials may be low-crystalline carbon subjected to a heat treatment at a temperature of about 1000° C. or less, or may be amorphous carbon. The shapes of the carbon materials may be any of fibrous, spherical, granular, and scaly.

Further, the negative electrode material is, for example, a material (a metallic material) containing any one of, or two or more of metal elements and metalloid elements as constituent element (s). This is because a high energy density is obtained.

The metallic material may be any of a simple substance, an alloy, a compound, may be two or more thereof, or may be a material at least partially including one or two or more phases thereof. However, the alloy includes a material containing one or more metal elements and one or more metalloid elements, in addition to an alloy made of two or more metal elements. Further, the alloy may also include a non-metal element. The compositional structure of the metallic material is, for example, a solid solution, a eutectic (eutectic mixture), an intermetallic compound, and a coexisting material of two or more thereof.

The metal elements and metalloid elements may be, for example, any one of, or two or more of metal elements and metalloid elements capable of forming an alloy with lithium. Specific examples of the metal elements and metalloid elements include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

Among the elements, one or both of silicon and tin is preferable. This is because the ability to occlude and release lithium is excellent, thus achieving a remarkably high energy density.

The material containing one or both of silicon and tin as a constituent element may be any of a simple substance, an alloy, and a compound of silicon, may be any of a simple substance, an alloy, and a compound of tin, may be two or more thereof, or may be a material that has one or two or more phases thereof at least in part. The term "simple substance" explained herein consistently means a simple substance (which may contain trace amounts of impurities) in a general sense, and thus the term does not necessarily mean a purity of 100%.

The alloy of silicon contains, for example, as a constituent element other than silicon, any one of, or two or more of tin, nickel, copper, iron, cobalt, manganese, zinc, indium, silver, titanium, germanium, bismuth, antimony, and chromium. The compound of silicon contains, for example, as a constituent element other than silicon, any one of, or two or more of carbon and oxygen. The compound of silicon may contain, for example, as a constituent element other than silicon, any one of, or two or more of the series of elements described for the alloy of silicon.

Specific examples of the alloy of silicon and the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), and LiSiO. v in $SiO_v$ may be $0.2<v<1.4$.

The alloy of tin contains, for example, as a constituent element other than tin, any one of, or two or more of silicon, nickel, copper, iron, cobalt, manganese, zinc, indium, silver, titanium, germanium, bismuth, antimony, and chromium. The compound of tin contains, for example, as a constituent element other than tin, any one of, or two or more of carbon and oxygen. It should be understood should be understood that the compound of tin may contain, for example, as a constituent element other than tin, any one of, or two or more of the series of elements described for the alloy of tin.

Specific examples of the alloy of tin and the compound of tin include $SnO_w$ ($0<w\leq2$), $SnSiO_3$, LiSnO, and $Mg_2Sn$.

In particular, the material containing tin as a constituent element is preferably, for example, a material (Sn-containing material) containing a second constituent element and a third constituent element, together with tin which is a first constituent element. The second constituent element contains, for example, any one of, or two or more of cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon. The third constituent element contains, for example, any one of, or two or more of boron, carbon, aluminum, and phosphorus. This is because the Sn-containing material contains the second constituent element and the third constituent element, thereby achieving a high battery capacity, excellent cycle characteristics, and the like.

In particular, the Sn-containing material is preferably a material (SnCoC-containing material) containing tin, cobalt, and carbon as constituent elements. In the SnCoC-containing material, for example, the content of carbon is from 9.9 mass % to 29.7 mass %, and the ratio between the contents of tin and cobalt (Co/(Sn+Co)) is from 20 mass % to 70 mass %. This is because a high energy density is obtained.

The SnCoC-containing material has a phase containing tin, cobalt, and carbon, and the phase is preferably low-crystalline or amorphous. This phase is a reaction phase capable of reacting with lithium, excellent characteristics are thus achieved due to the presence of the reaction phase. The half-value width (a diffraction angle 2θ) of the diffraction peak obtained by X-ray diffraction of this reaction phase is preferably 1° or more in the case of using the CuKα ray as a specific X-ray and providing a sweep speed of 1°/min. This is because lithium is occluded and released more smoothly, and reactivity with the electrolytic solution is reduced. The SnCoC-containing material may include, in addition to the low-crystalline or amorphous phase, a phase containing therein a simple substance or a part of each constituent element in some cases.

Whether the diffraction peak obtained by X-ray diffraction corresponds to the reaction phase capable of reacting with lithium can be easily determined by comparing the X-ray diffraction chart before and after the electrochemical reaction with lithium. For example, when the position of the diffraction peak is changed between before and after the electrochemical reaction with lithium, the peak corresponds to the reaction phase capable of reacting with lithium. In this case, for example, the diffraction peak of the low-crystalline or amorphous reaction phase is observed at 2θ=20° to 50°. Such a reaction phase contains, for example, the constituent elements described above, and it is believed that the phase is low crystallized or amorphized mainly due to the presence of carbon.

In the SnCoC-containing material, the carbon as a constituent element is preferably at least partially bonded to a metal element or a metalloid element which is another constituent element. This is because aggregation or crystallization of tin and the like is suppressed. It is possible to confirm the bonding states of the elements through the use of, for example, X-ray photoelectron spectroscopy (XPS). For commercially available devices, for example, the Al—Kα ray or the Mg—Kα ray is used as a soft X-ray. When carbon is at least partially bonded to a metal element, a metalloid element, or the like, the peak of the synthetic wave of the 1s orbital (C 1s) of carbon appears in a region that is lower than 284.5 eV. The peak of the 4f orbital (Au 4f) of a gold atom is assumed to be subjected to energy calibration so as to be obtained at 84.0 eV. In this regard, typically, surface contaminated carbon is present on the surface of the substance, and thus, while the peak of C 1s of the surface contaminated carbon is determined to be 284.8 eV, the peak is regarded as an energy reference. In the XPS measurement, the waveform of the C 1s peak is obtained in a form including the peak of the surface contaminated carbon and the peak of the carbon in the SnCoC-containing material. For this reason, both the peaks are separated, for example, by analysis with the use of commercially available software. In the analysis of the waveform, the position of the main peak present on the lowest binding energy side is determined to be an energy reference (284.8 eV).

This SnCoC-containing material is not limited to a material (SnCoC) in which the constituent elements are only tin, cobalt, and carbon. For example, in addition to tin, cobalt, and carbon, this SnCoC-containing material may further contain any one of, or two or more of silicon, iron, nickel, chromium, indium, niobium, germanium, titanium, molybdenum, aluminum, phosphorus, gallium, and bismuth as constituent elements.

In addition to the SnCoC-containing material, a material (SnCoFeC-containing material) containing tin, cobalt, iron, and carbon as constituent elements is also preferable. This SnCoFeC-containing material has an arbitrary composition. To give an example, when the content of iron is set to a small value, the content of carbon is from 9.9 mass % to 29.7 mass %, the content of iron is from 0.3 mass % to 5.9 mass %, and the ratio between the contents of tin and cobalt (Co/(Sn+Co)) is from 30 mass % to 70 mass %. Further, when the content of iron is set to a large value, the content of carbon is from 11.9 mass % to 29.7 mass %, the ratio among the contents of tin, cobalt, and iron ((Co+Fe)/(Sn+Co+Fe)) is from 26.4 mass % to 48.5 mass %, and the ratio between the contents of cobalt and iron (Co/(Co+Fe)) is from 9.9 mass % to 79.5 mass %. This is because a high energy density is obtained in such a composition range. The physical properties (e.g., half-value width) of the SnCoFeC-containing material are similar to the physical properties of the SnCoC-containing material.

Besides, the negative electrode material is, for example, any one of, or two or more of metal oxides and polymer compounds. The metal oxides are, for example, iron oxides, ruthenium oxides or molybdenum oxides. The polymer compounds are, for example, polyacetylene, polyaniline or polypyrrole.

In particular, the negative electrode material preferably contains both the carbon material and the metallic material for the following reasons.

A metallic material, particularly, a material containing one or both of silicon and tin as a constituent element has an advantage of high theoretical capacity, meanwhile it has a concern about being likely to expand and shrink greatly during charging and discharging. Although the carbon material has a concern about being low in theoretical capacity, it has an advantage of being unlikely to expand and shrink during charging and discharging. Therefore, the use of both the carbon material and the metallic material suppresses the expansion and shrinkage during charging and discharging while achieving a high theoretical capacity (in other words, battery capacity).

The negative electrode active material layer 22B is formed by any one, or two or more of methods such as a coating method, a vapor phase method, a liquid phase method, a thermal spraying method, and a firing method (sintering method). The coating method is, for example, a method of mixing a negative electrode active material in the particle (powder) form with a negative electrode binder or the like, dispersing the mixture in an organic solvent or the like, and then applying the resulting mixture to the negative electrode current collector 22A. The vapor phase method is, for example, a physical deposition method or chemical deposition method. More specifically, the vapor phase method may be, for example, a vacuum deposition method, a sputtering method, an ion plating method, a laser ablation method, thermal chemical vapor deposition, a chemical vapor deposition (CVD) method or a plasma chemical vapor deposition method. The liquid phase method is, for example, an electrolytic plating method or an electroless plating method. The thermal spraying method is a method of spraying a molten or a semi-molten negative electrode active material onto the surface of the negative electrode current collector 22A. The firing method is, for example, a method of applying a mixture dispersed in an organic solvent or the like to the negative electrode current collector 22A by using the coating method, and then performing a heat treatment at a temperature higher than the melting point of the negative electrode binder or the like. For example, an atmospheric firing method, a reactive firing method or a hot press firing method may be used as the firing method.

In this secondary battery, the electrochemical equivalent of the negative electrode material capable of occluding and releasing lithium is larger than the electrochemical equivalent of the positive electrode in order to prevent lithium from being unintentionally deposited on the negative electrode 22 in the process of charging as described above. In addition, when an open circuit voltage (i.e., the battery voltage) in a fully charged state is 4.25 V or more, the release amount of the lithium per unit mass is increased even with the use of the same positive electrode active material as compared with the case where the open circuit voltage in the fully charged state is 4.20 V, and thus the amount of the positive electrode active material and the amount of the negative electrode active material are adjusted depending on the release amount. Thus, a high energy density is achieved.

The open circuit voltage in the fully charged state is not particularly limited, and it is preferably 4.25 V or more, as described above. Particularly, the open circuit voltage in the fully charged state is more preferably 4.35 V or more. This is because even if the open circuit voltage in the fully charged state is remarkably increased, advantages due to the sulfonyl compound are obtained, and thus excellent battery characteristics are obtained.

For example, as illustrated in FIG. 13, the separator 23 is disposed between the positive electrode 21 and the negative electrode 22. The separator 23 separates the positive electrode 21 and the negative electrode 22, and allows passage of lithium ions while preventing a short circuit due to the current caused by the contact between both the positive electrode 21 and the negative electrode 22.

The separator 23 is, for example, any one of, or two or more of porous membranes such as synthetic resins and ceramics, and may be a laminated film of two or more porous membranes. Examples of the synthetic resins include polytetrafluoroethylene, polypropylene, and polyethylene.

Particularly, the separator 23 may include, for example, the above-described porous membrane (base material layer), and a polymer compound layer provided on one side or both sides of the base material layer. This is because the adhesion of the separator 23 to each of the positive electrode 21 and the negative electrode 22 is improved, thereby suppressing the warping of the wound electrode body 20. Thus, the inhibited decomposition reaction of the electrolytic solution, and also, the suppressed leakage of the electrolytic solution with which the base material layer is impregnated, make the electric resistance less likely to increase even with repeated charging/discharging, and suppress the swelling of the battery.

The polymer compound layer includes, for example, a polymer compound such as polyvinylidene fluoride. This is because the polymer material is excellent in physical strength, and electrochemically stable. However, the polymer compound may be a compound other than polyvinylidene fluoride. In the case of forming the polymer compound layer, for example, a solution produced by dissolving a polymer compound in an organic solvent or the like is applied to the base material layer, and then the base material layer is dried. After immersing the base material layer in the solution, the base material layer may be dried. This polymer compound layer may include any one of, or two or more of insulating particles such as inorganic particles. The type of inorganic particles is, for example, aluminum oxide or aluminum nitride.

As described above, the separator 23 is impregnated with an electrolytic solution. However, for example, the positive electrode 21 may be impregnated with the electrolytic solution, or the negative electrode 22 may be impregnated with the electrolytic solution.

The electrolytic solution contains a solvent and an electrolyte salt. However, the electrolytic solution may further contain any one of, or two or more of other materials such as additives.

The solvent includes any one of, or two or more of nonaqueous solvents such as organic solvents. The electrolytic solution including a nonaqueous solvent is a so-called nonaqueous electrolytic solution.

Specifically, the nonaqueous solvent is, for example, a cyclic carbonate ester, a chain carbonate ester, lactone, a chain carboxylate ester or nitrile (mononitrile). This is because excellent battery capacity, cycle characteristics, storage characteristics, and the like are achieved.

The cyclic carbonate ester is, for example, ethylene carbonate, propylene carbonate or butylene carbonate. The chain carbonate ester is, for example, dimethyl carbonate, diethyl carbonate, ethyl methyl carbonate or methyl propyl carbonate. The lactone is, for example, γ-butyrolactone or γ-valerolactone. The chain carboxylate ester is, for example, methyl acetate, ethyl acetate, methyl propionate, ethyl propionate, methyl butyrate, methyl isobutyrate, methyl trimethylacetate or ethyl trimethylacetate. The nitrile is, for example, acetonitrile, methoxyacetonitrile or 3-methoxypropionitrile.

Besides, the nonaqueous solvent may be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate or dimethylsulfoxide. This is because similar advantages are obtained.

In particular, the solvent preferably contains any one of, or two or more of ethylene carbonate, propylene carbonate, dimethyl carbonate, diethyl carbonate, and ethyl methyl carbonate. This is because an excellent battery capacity, excellent cycle characteristics, excellent storage characteristics, and the like are achieved. In this case, it is more preferable to combine a high-viscosity (high dielectric constant) solvent (for example, relative permittivity ε≥30) such as ethylene carbonate or propylene carbonate with a low-viscosity solvent (for example, viscosity≤1 mPa·s) such as dimethyl carbonate, ethyl methyl carbonate or diethyl carbonate. This is because the dissociation and ion mobility of the electrolyte salt are improved.

Particularly, the solvent may include any one of, or two or more of an unsaturated cyclic carbonate ester, a halogenated carbonate ester, a sulfonate ester, an acid anhydride, a dicyano compound (a dinitrile compound), a diisocyanate compound, a phosphate ester, and a chain compound having a carbon-carbon triple bond. This is because the chemical stability of the electrolytic solution is improved.

The unsaturated cyclic carbonate ester refers to a cyclic carbonate ester including one or two or more unsaturated bonds (carbon-carbon double bonds or carbon-carbon triple bonds). The unsaturated cyclic carbonate ester is, for example, vinylene carbonate, vinyl ethylene carbonate or methylene ethylene carbonate. The content of the unsaturated cyclic carbonate ester in the solvent is not particularly limited, and is, for example, from 0.01 wt % to 10 wt %.

The halogenated carbonate ester refers to a cyclic or chain carbonate ester containing one or two or more halogen elements as constituent elements. When the halogenated carbonate ester contains two or more halogen elements as constituent elements, the two or more halogen elements may be only one type or two or more types. The cyclic halogenated carbonate ester is, for example, 4-fluoro-1,3-dioxolane-2-one, or 4,5-difluoro-1,3-dioxolan-2-one. The chain halogenated carbonate ester is, for example, fluoromethyl methyl carbonate, bis(fluoromethyl) carbonate, or difluoromethyl methyl carbonate. The content of the halogenated carbonate ester in the solvent is not particularly limited, and is, for example, from 0.01 wt % to 50 wt %.

The sulfonate ester is, for example, a monosulfonate ester or a disulfonate ester. The content of the sulfonate ester in the solvent is not particularly limited, and is, for example, from 0.01 wt %/o to 10 wt %.

The monosulfonate ester may be a cyclic monosulfonate ester or a chain monosulfonate ester. The cyclic monosulfonate ester is, for example, a sultone such as 1,3-propane sultone or 1,3-propene sultone. The chain monosulfonate ester is, for example, a compound in which a cyclic monosulfonate ester is cleaved at a middle site. The disulfonate ester may be a cyclic disulfonate ester or a chain disulfonate ester.

The acid anhydride is, for example, a carboxylic acid anhydride, a disulfonic acid anhydride or a carboxylic sulfonic acid anhydride. The carboxylic acid anhydride is, for example, a succinic anhydride, a glutaric anhydride or a maleic anhydride. The disulfonic acid anhydride is, for example, an ethanedisulfonic anhydride or a propanedisulfonic anhydride. The carboxylic sulfonic acid anhydride is, for example, a sulfobenzoic anhydride, a sulfopropionic anhydride or a sulfobutyric anhydride. The content of the acid anhydride in the solvent is not particularly limited, and is, for example, from 0.5 wt % to 5 wt %.

The dinitrile compound is, for example, a compound represented by $NC-C_mH_{2m}-CN$ (m is an integer of 1 or more). This dinitrile compound is, for example, succinonitrile ($NC-C_2H_4-CN$), glutaronitrile ($NC-C_3H_6-CN$), adiponitrile ($NC-C_4H_8-CN$) or phthalonitrile ($NC-C_6H_4-CN$). The content of the dinitrile compound in the solvent is not particularly limited, and is, for example, from 0.5 wt % to 5 wt %.

The diisocyanate compound is, for example, a compound represented by $OCN-C_nH_{2n}-NCO$ (n is an integer of 1 or more). This diisocyanate compound is, for example, hexamethylene diisocyanate ($OCN-C_6H_{12}-NCO$). The content of the diisocyanate compound in the solvent is not particularly limited, and is, for example, from 0.5 wt % to 5 wt %.

The phosphate ester is, for example, trimethyl phosphate or triethyl phosphate. The content of the phosphate ester in the solvent is not particularly limited, and is, for example, from 0.5 wt % to 5 wt %.

The chain compound having a carbon-carbon triple bond is a chain compound having one or two or more carbon-carbon triple bonds ($-C\equiv C-$). The chain compound having a carbon-carbon triple bond is, for example, propargyl methyl carbonate ($CH-C-CH_2-O-C(=O)-O-CH_3$) or propargyl methyl sulfonate ($CH\equiv C-CH_2-O-S(=O)_2-CH_3$). The content of the chain compound having a carbon-carbon triple bond in the solvent is not particularly limited, and is, for example, from 0.5 wt % to 5 wt %.

The electrolyte salt includes, for example, any one of, or two or more of salts such as lithium salts. However, the electrolyte salt may contain, for example, a salt other than lithium salts. The salt other than lithium is, for example, a salt of a light metal other than lithium.

The lithium salt is, for example, lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl) or lithium bromide (LiBr). This is because excellent battery capacity, cycle characteristics, storage characteristics, and the like are achieved.

Above all, any one of, or two or more of lithium hexafluorophosphate, lithium tetrafluoroborate, lithium perchlorate, and lithium hexafluoroarsenate is preferable, and lithium hexafluorophosphate is more preferable. This is because the internal resistance is lowered, thus achieving a greater effect.

The content of the electrolyte salt is not particularly limited, and is preferably from 0.3 mol/kg to 3.0 mol/kg with respect to the solvent. This is because a high ion conductivity is achieved.

Subsequently, the operation of the secondary battery will be described.

In this secondary battery, as illustrated in FIGS. 1 and 13, during charging, lithium ions are released from the positive electrode 21, and the lithium ions are occluded in the negative electrode 22 through the electrolytic solution. Further, in the secondary battery, during discharging, lithium ions are released from the negative electrode 22, and the lithium ions are occluded in the positive electrode 21 through the electrolytic solution.

In this case, when the internal pressure of the battery can 11 increases, the safety valve mechanism 30 operates to prevent the secondary battery from being ruptured and damaged. Specifically, during normal operation of the secondary battery, the safety cover 31 (the opening valve portion 31R) is not opened, as illustrated in FIGS. 2, 3, 6, and 7. Accordingly, even if the plurality of opening portions 33K is provided in the stripper disk 33, gas discharge paths through the plurality of opening portions 33K are closed by the opening valve portion 31R.

On the other hand, when gas is generated due to a side reaction such as a decomposition reaction of the electrolytic solution inside the battery can 11 during charging and discharging of the secondary battery, the gas is accumulated inside the battery can 11 and thus the internal pressure of the battery can 11 increases. In this case, when the internal pressure of the battery can 11 reaches a certain level or more, as illustrated in FIGS. 4, 5, 8, and 9, the safety cover 31 (the opening valve portion 31R) is opened and thus the opening portions 13K are formed. As a result, the gas discharge paths through the plurality of opening portions 33K are opened, and the gas generated inside the battery can 11 is discharged to the outside through the plurality of opening portions 33K and the opening portion 13K in this order.

In this case, particularly, as described above, the two conditions are satisfied with respect to the number and positional relationship of the plurality of opening portions 33K and the number and positional relationship of the plurality of protrusion portions. Therefore, the gas generated inside the battery can 11 is sufficiently discharged through the plurality of opening portions 33K while the physical strength of the stripper disk 33 is secured. Consequently, a sufficient amount of gas is stably released from the inside to the outside of the secondary battery.

This secondary battery is produced, for example, by the following procedure.

In the case of producing the positive electrode 21, first, a positive electrode active material is mixed with a positive electrode binder, a positive electrode conductive agent or the like, if necessary, thereby preparing a positive electrode mixture. Then, the positive electrode mixture is dispersed in an organic solvent or the like, thereby preparing a paste-like positive electrode mixture slurry. Thereafter, the positive electrode mixture slurry is applied to both sides of the positive electrode current collector 21A, and the positive electrode mixture slurry is dried, thereby forming the positive electrode active material layer 21B. After that, the positive electrode active material layer 21B is subjected to compression-molding with the use of a roll press machine or the like while heating the positive electrode active material layer 21B, if necessary. In this case, compression-molding may be repeated a plurality of times.

In the case of producing the negative electrode 22, the negative electrode active material layer 22B is formed on both sides of the negative electrode current collector 22A by the same procedure as the positive electrode 21. Specifically, a negative electrode mixture is prepared by mixing a negative electrode active material with a negative electrode binder, a negative electrode conductive agent or the like, and then the negative electrode mixture is dispersed in an organic solvent or the like to prepare a paste-like negative electrode mixture slurry. Then, the negative electrode mixture slurry is applied to both sides of the negative electrode current collector 22A, and the negative electrode mixture slurry is dried, thereby forming the negative electrode active material layer 22B. Finally, the negative electrode active material layer 22B is subjected to compression-molding with the use of a roll press machine.

In the case of assembling the secondary battery, the positive electrode lead 25 is connected to the positive electrode current collector 21A by using a welding method or the like, and the negative electrode lead 26 is connected to the negative electrode current collector 22A by using a welding method or the like. Then, the positive electrode 21 and the negative electrode 22 are stacked with the separator 23 interposed therebetween, and the wound electrode body 20 is formed by winding the positive electrode 21, the negative electrode 22, and the separator 23. Then, the center pin 24 is inserted into the wound center space 20C of the wound electrode body 20.

Subsequently, while the wound electrode body 20 is sandwiched by the pair of insulating plates 12 and 13, the wound electrode body 20 is housed inside the battery can 11. In this case, an end of the positive electrode lead 25 is connected to the safety valve mechanism 30 by using a welding method or the like, and an end of the negative electrode lead 26 is connected to the battery can 11 by using a welding method or the like. Subsequently, an electrolytic solution is injected into the battery can 11, thereby impregnating the wound electrode body 20 with the electrolytic solution. Finally, the battery cover 14, the thermosensitive resistive element 15, and the safety valve mechanism 30 are crimped to the opening end of the battery can 11 using the gasket 17. Thus, the secondary battery is completed.

According to this secondary battery (lithium ion secondary battery), the safety valve mechanism 30 includes the safety cover 31 and the stripper disk 33. The safety cover 31 includes the opening valve portion 31R, and the stripper disk 33 includes the plurality of opening portions 33K and the plurality of protrusion portions 33T. With respect to the plurality of opening portions 33K and the plurality of protrusion portions 33T, the following two conditions are satisfied: the number of the opening portions 33K and the number of the protrusion portions 33T are equal to each other, and each of the plurality of opening portions 33K and each of the plurality of protrusion portions 33T are opposed to each other in the direction toward the center P of the stripper disk 33.

In this case, as compared with the case where the two conditions are not satisfied with respect to the plurality of opening portions 33K and the plurality of protrusion portions 33T, as described above, the gas generated inside the battery can 11 is sufficiently discharged to the outside through the plurality of opening portions 33K while the physical strength of the stripper disk 33 is secured. Therefore, even if gas is generated inside the battery can 11, a sufficient amount of gas is stably discharged to the outside of the battery can 11, so that the safety of the secondary battery can be improved.

The case where the two conditions are not satisfied with respect to the plurality of opening portions 33K and the plurality of protrusion portions 33T is, for example, as illustrated in FIG. 14 corresponding to FIG. 10, the case where the number of the opening portions 33K and the number of the protrusion portions 33T are equal to each other, but each of the plurality of opening portions 33K and each of the plurality of protrusion portions 33T are not opposed to each other in the direction toward the center P of the stripper disk 33.

In the case illustrated in FIG. 14, the number of the opening portions 33K is 6 and the number of the protrusion portions 33T is also 6, and thus the number of the opening portions 33K and the number of the protrusion portions 33T are equal to each other. However, in the direction toward the center P of the stripper disk 33, the center position of each of the plurality of opening portions 33K and the center position of each of the plurality of protrusion portions 33T are displaced from each other, whereby each of the plurality of opening portions 33K and each of the plurality of protrusion portions 33T are not opposed to each other. The configuration of the stripper disk 33 illustrated in FIG. 14 is the same as the configuration of the stripper disk 33 illustrated in FIG. 10, except that each of the plurality of opening portions 33K and each of the plurality of protrusion portions 33T are not opposed to each other in the direction toward the center P of the stripper disk 33.

Particularly, when the number of the opening portions 33K is from 6 to 8 and the number of the protrusion portions 33T is from 6 to 8, the relationship between the number of the opening portions 33K and the number of the protrusion portions 33T is optimized as described above. Therefore, the physical strength of the stripper disk 33 is further improved while securing the gas discharging efficiency using the plurality of opening portions 33K, so that a higher effect can be obtained.

Further, when the opening ratio is from 20% to 60%, the relationship between the area of the opening valve portion 31R (the opening area of the opening portion 31K) and the sum of the opening areas of the opening portions 33K (the total opening area of the plurality of opening portions 33K) is optimized as described above. Therefore, the gas discharging efficiency using the plurality of opening portions 33K is further improved, so that a higher effect can be obtained.

The secondary battery described here is a cylindrical lithium metal secondary battery in which the capacity of the negative electrode 22 is obtained through the deposition and dissolution of lithium metal.

The lithium metal secondary battery has the same configuration as that of the lithium ion secondary battery, except that the negative electrode active material layer 22B is formed of lithium metal, and the lithium metal secondary battery operates similarly to the operation of the lithium ion secondary battery. Further, the lithium metal secondary battery is produced by the same procedure as the procedure of producing the lithium ion secondary battery.

In this secondary battery, since lithium metal is used as a negative electrode active material, a high energy density can be obtained. Although the negative electrode active material layer 22B may be already present from the time of assembly, it is not present at the time of assembly and may be formed of lithium metal deposited during charging. Further, the negative electrode current collector 22A may be omitted by using the negative electrode active material layer 22B as a current collector.

This secondary battery operates as follows, for example. During charging, lithium ions are released from the positive electrode 21, and the lithium ions are deposited as lithium metal on the surface of the negative electrode current collector 22A through the electrolytic solution. On the other hand, during discharging, the lithium metal from the negative electrode active material layer 22B as lithium ions is eluted in the electrolytic solution, and the lithium ions are occluded in the positive electrode 21 through the electrolytic solution. Also, in this case, the safety valve mechanism 30 is used to discharge gas from the inside of the battery can 11 to the outside through the plurality of opening portions 33K, if necessary.

This lithium metal secondary battery includes the safety valve mechanism 30, similarly to the lithium ion secondary battery. Therefore, even if gas is generated in the battery can 11, a sufficient amount of gas is stably released to the outside of the battery can 11, for the same reason as that for the lithium ion secondary battery. Therefore, the safety of the secondary battery can be improved.

The other actions and effects relating to the lithium metal secondary battery are similar to other actions and effects relating to the lithium ion secondary battery.

The configuration of the secondary battery can be changed as appropriate.

Specifically, the configuration of the safety cover 31 (the opening valve portion 31R) is not particularly limited as long as the safety cover 31 can be opened in response to an increase in the internal pressure of the battery can 11.

Figure 15:
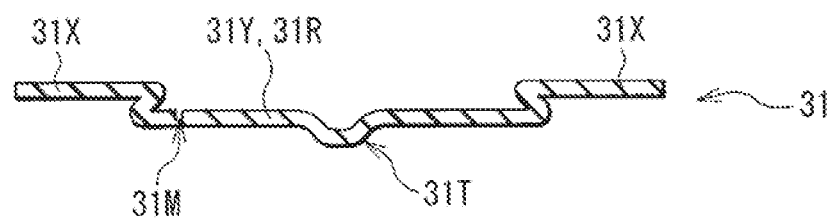
FIG. 15 is a cross-sectional view for explaining a first modified example of a configuration of a safety cover (in a state before the safety cover is opened) according to an embodiment of the present technology.
Figure 16:
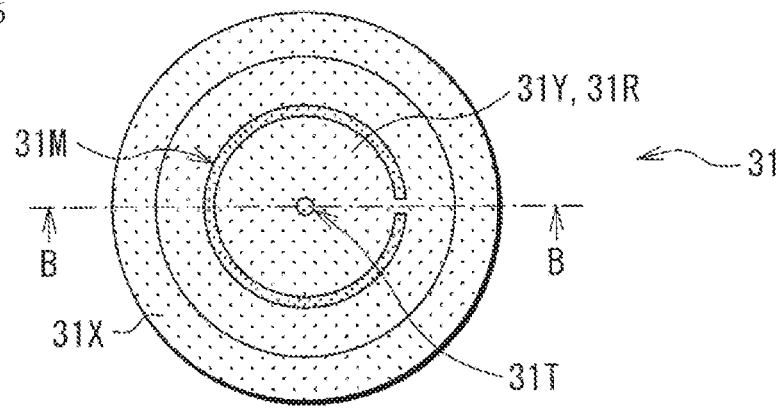
FIG. 16 is a plan view illustrating the configuration of the safety cover illustrated in FIG. 15 according to an embodiment of the present technology.

For example, as illustrated in FIGS. 15 and 16 corresponding to FIGS. 6 and 7, the planar shape of the groove 31M may be a substantially circular ring shape with a partially cut-out portion.

Figure 17:
FIG. 17 is a cross-sectional view for explaining the first modified example of the configuration of the safety cover (in a state after the safety cover is opened) according to an embodiment of the present technology.
Figure 18:
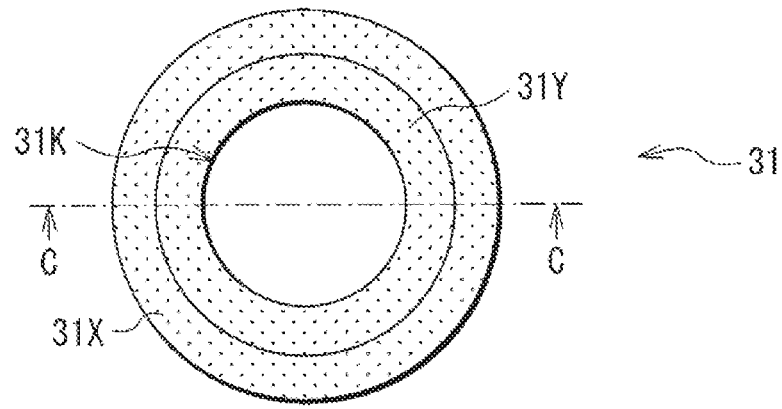
FIG. 18 is a plan view illustrating the configuration of the safety cover illustrated in FIG. 17 according to an embodiment of the present technology.

Even in this case, for example, as illustrated in FIGS. 17 and 18 corresponding to FIGS. 8 and 9, the opening valve portion 31R is cleaved in response to an increase of the internal pressure of the battery can 11, whereby the safety cover 31 (the opening valve portion 31R) is opened. Therefore, the opening portion 31K is formed, and thus the same effect can be obtained. In this case, since the opening valve portion 31R is partially connected to the central portion 31Y after the formation of the opening portion 31K, the opening valve portion 31R remains even after the formation of the opening portion 31K. However, in FIG. 18, the opening valve portion 31R is omitted in illustration, for easy viewing of the opening portion 31K.

Figure 19:
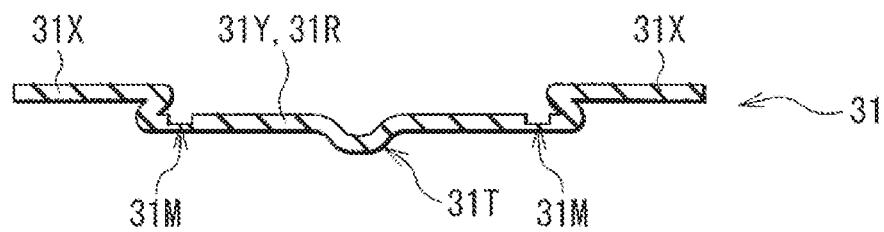
FIG. 19 is a cross-sectional view for explaining a second modified example of a configuration of a safety cover (in a state before the safety cover is opened) according to an embodiment of the present technology.
Figure 20:
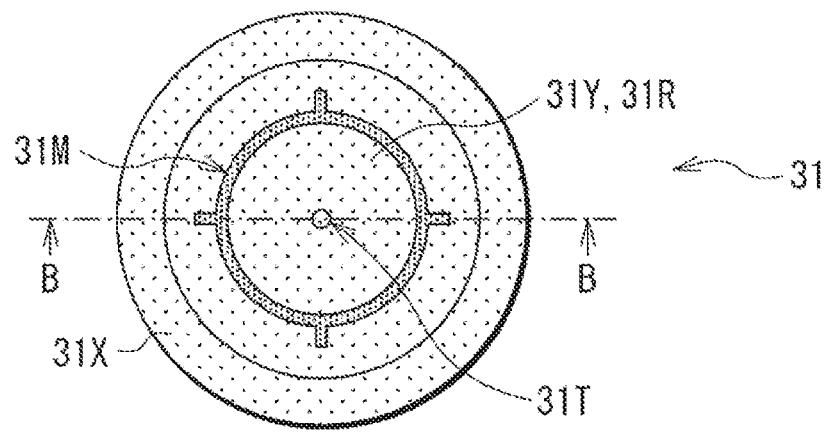
FIG. 20 is a plan view illustrating the configuration of the safety cover illustrated in FIG. 19 according to an embodiment of the present technology.

Alternatively, for example, as illustrated in FIGS. 19 and 20 corresponding to FIGS. 6 and 7, the planar shape of the groove 31M may be a substantially circular ring shape in which protruding extended regions are provided in four directions.

Figure 21:
FIG. 21 is a cross-sectional view for explaining the second modified example of the configuration of the safety cover (in a state after the safety cover is opened) according to an embodiment of the present technology.
Figure 22:
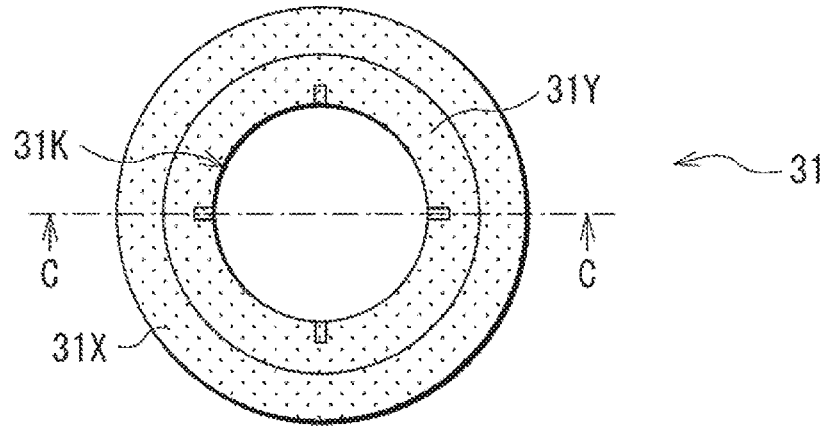
FIG. 22 is a plan view illustrating the configuration of the safety cover illustrated in FIG. 21 according to an embodiment of the present technology.

Even in this case, for example, as illustrated in FIGS. 21 and 22 corresponding to FIGS. 8 and 9, the opening valve portion 31R is removed in response to an increase in internal pressure of the battery can 11, whereby the safety cover 31 (the opening valve portion 31R) is opened. Therefore, the opening portion 31K is formed, and thus the same effect can be obtained. In this case, the central portion 31Y is likely to be cut in the groove 31M due to the groove 31M including the four protruding extended regions, whereby the opening portion 31K is easily formed.

Figure 23:
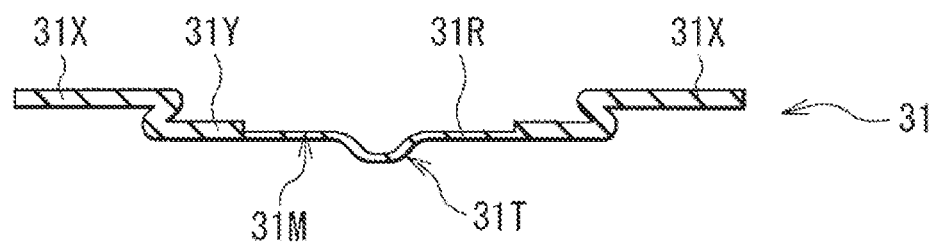
FIG. 23 is a cross-sectional view for explaining a third modified example of a configuration of a safety cover (in a state before the safety cover is opened) according to an embodiment of the present technology.
Figure 24:
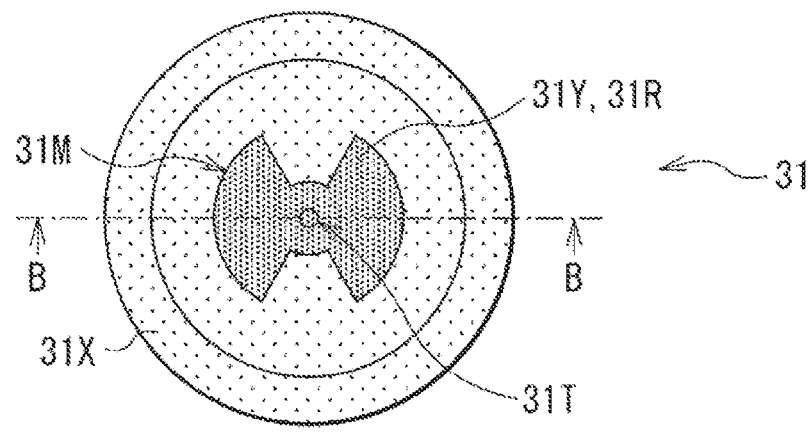
FIG. 24 is a plan view illustrating the configuration of the safety cover illustrated in FIG. 23 according to an embodiment of the present technology.

Alternatively, for example, as illustrated in FIGS. 23 and 24 corresponding to FIGS. 6 and 7, the planar shape of the groove 31M may be any shape corresponding to the opening shape of the opening portion 31K. Here, the planar shape of the groove 31M is, for example, substantially ribbon-like shape. The substantially ribbon-like planar shape is, for example, a shape in which two fan-like shapes, arranged opposite to each other so that sharp angular points coincide with each other, are overlapped with a circle.

Figure 25:
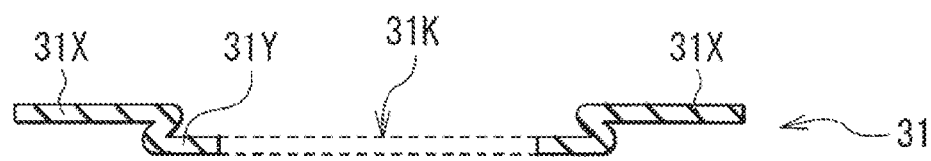
FIG. 25 is a cross-sectional view for explaining the third modified example of the configuration of the safety cover (in a state after the safety cover is opened) according to an embodiment of the present technology.
Figure 26:
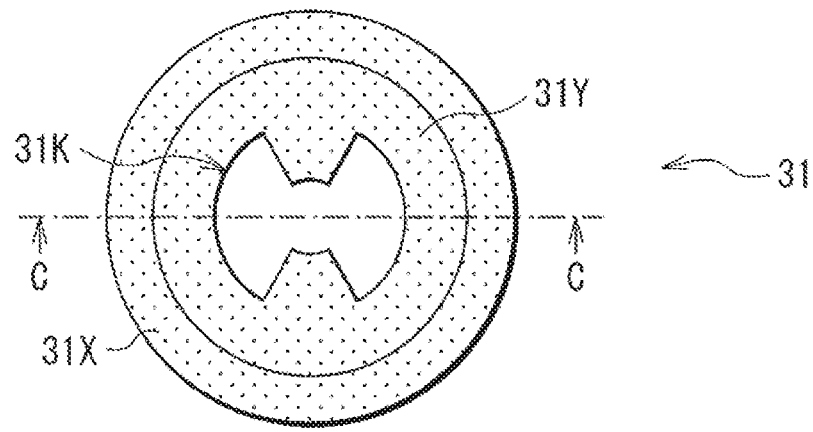
FIG. 26 is a plan view illustrating the configuration of the safety cover illustrated in FIG. 25 according to an embodiment of the present technology.

Even in this case, for example, as illustrated in FIGS. 25 and 26 corresponding to FIGS. 8 and 9, the opening valve portion 31R is removed in response to an increase in internal pressure of the battery can 11, whereby the safety cover 31 (the opening valve portion 31R) is opened. Therefore, the opening portion 31K is formed, and thus the same effect can be obtained. In this case, the opening portion 31K thus formed has an opening shape corresponding to the planar shape of the opening valve portion 31R.

Subsequently, application examples of the above-described secondary battery will be described.

The application of the secondary battery is not particularly limited, as long as the secondary battery is applied to machines, devices, instruments, apparatuses, systems, and the like (assembly of a plurality of devices or the like) that can use the secondary battery as a driving power supply, a power storage source for reserve of power, or the like. The secondary battery for use as a power supply may be served as a main power supply or an auxiliary power supply. The main power supply is a power supply that is used preferentially, regardless of the presence or absence of other power supplies. The auxiliary power supply may be, for example, a power supply which is used instead of the main power supply, or a power supply which is switched from the main power supply, if necessary. When the secondary battery is used as an auxiliary power supply, the type of the main power supply is not limited to the secondary battery.

Here are applications of the secondary battery, for example: electronic devices (including portable electronic devices) such as video cameras, digital still cameras, mobile phones, laptop personal computers, cordless telephones, headphone stereos, portable radios, portable televisions, and portable information terminals; portable life instruments such as electric shavers; storage devices such as backup power supplies and memory cards; power tools such as electric drills and electric saws; battery packs mounted on laptop personal computers or the like as a detachable power supply; medical electronic devices such as pacemakers and hearing aids: electric vehicles such as electric cars (including hybrid cars); and power storage systems such as a domestic battery system that stores electric power in preparation for emergency or the like. Of course, the application of the secondary battery may be any other application than the foregoing.

Above all, it is effective to apply the secondary battery to a battery pack, an electric vehicle, a power storage system, a power tool, an electronic device, or the like. This is because, since these application require excellent battery characteristics, the use of the secondary battery according to the present technology can improve the performance effectively. The battery pack is a power supply that uses a secondary battery. As will be described later, this battery pack may use a unit cell or an assembled battery. The electric vehicle is a vehicle that operates (travels) with the secondary battery as a driving power supply, and may be a vehicle (a hybrid car or the like) provided with a driving source other than the secondary battery as mentioned above. The power storage system is a system using a secondary battery as a power storage source. For example, for a household power storage system, electric power is stored in the secondary battery which serves as a power storage source, thus making it possible to use home electric appliances and the like through the use of electric power. The power tool is a tool which makes a movable part (such as a drill) movable with the secondary battery as a driving power supply. The electronic device is a device that performs various functions with the secondary battery as a driving power supply (power supply source).

In this regard, some application examples of the secondary battery will be specifically described. The configuration of each application example described below is just considered by way of example, and the configuration of the application example can be thus changed appropriately.

Figure 27:
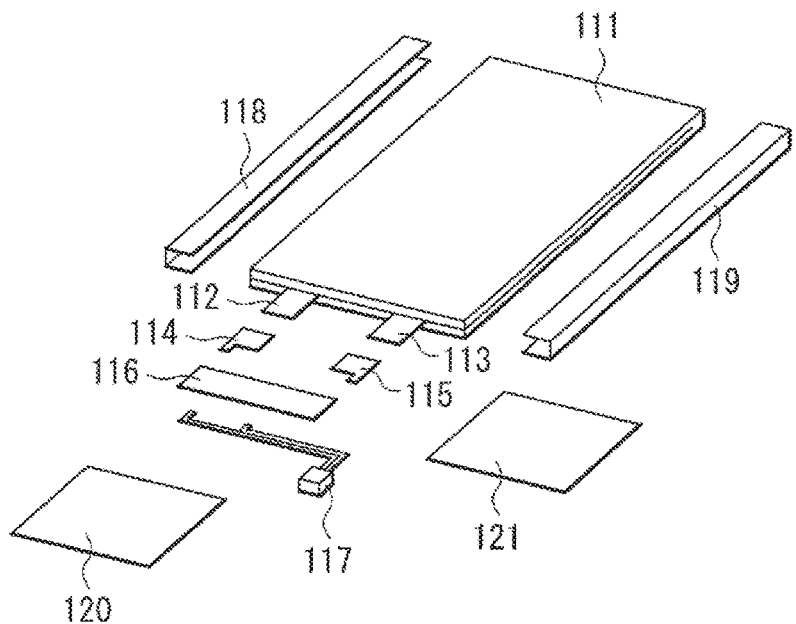
FIG. 27 is a perspective view illustrating a configuration of an application example (battery pack: unit cell) of a secondary battery according to an embodiment of the present technology.
Figure 28:
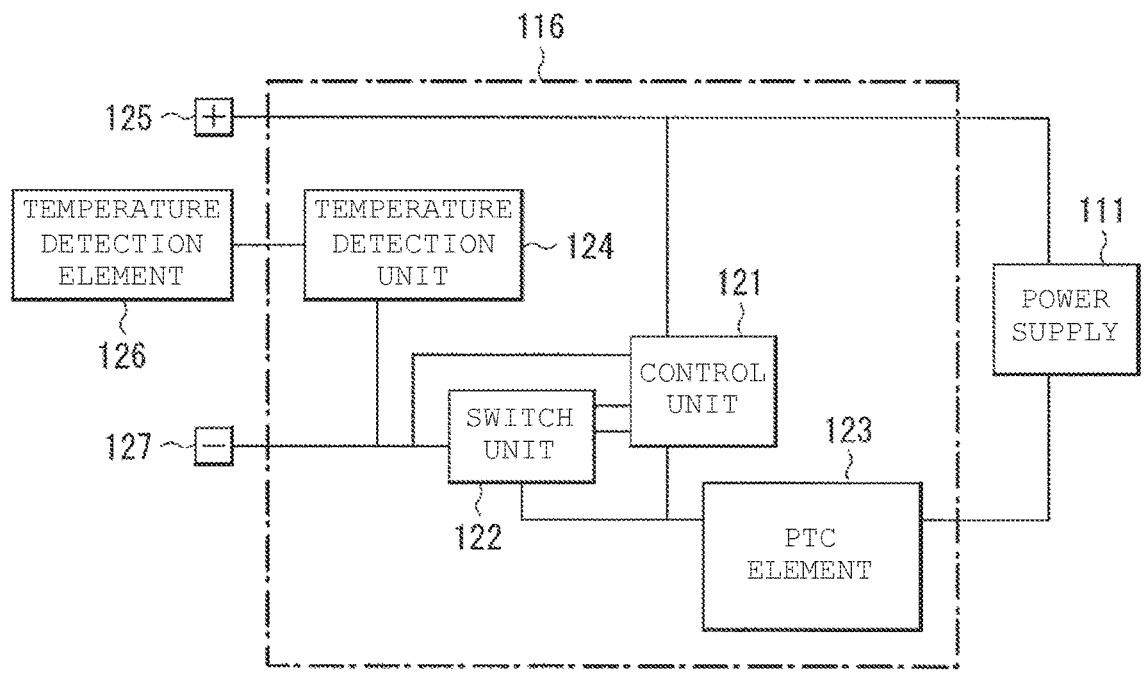
FIG. 28 is a block diagram illustrating the configuration of the battery pack illustrated in FIG. 27 according to an embodiment of the present technology.

FIG. 27 illustrates a perspective configuration of a battery pack that uses a unit cell. FIG. 28 illustrates a block configuration of the battery pack illustrated in FIG. 27. FIG. 27 illustrates the battery pack disassembled.

The battery pack described herein is a simplified battery pack (so-called soft pack) that uses a secondary battery according to the present technology, which is, for example, mounted on electronic devices typified by smart phones. This battery pack includes, for example, as illustrated in FIG. 27, a power supply 111 which is a laminate film-type secondary battery, and a circuit board 116 connected to the power supply 111. A positive electrode lead 112 and a negative electrode lead 113 are attached to the power supply 111.

A pair of adhesive tapes 118 and 119 is attached to both side surfaces of the power supply 111. The circuit board 116 has a protection circuit (PCM: Protection Circuit Module) formed. The circuit board 116 is connected to the positive electrode 112 via a tab 114, and connected to the negative electrode lead 113 via a tab 115. In addition, the circuit board 116 is connected to a connector lead wire 117 for external connection. In a state in which the circuit board 116 is connected to the power supply 111, the circuit board 116 is protected by a label 120 and an insulating sheet 121. The circuit board 116, the insulating sheet 121, and the like are fixed with the label 120 attached.

In addition, the battery pack includes, for example, as illustrated in FIG. 28, the power supply 111 and the circuit board 116. The circuit board 116 includes, for example, a control unit 121 (controller), a switch unit 122 (switch), a PTC element 123, and a temperature detection unit 124. It is possible to connect the power supply 111 to the outside via a positive electrode terminal 125 and a negative electrode terminal 127, and thus the power supply 111 is charged and discharged via the positive electrode terminal 125 and the negative electrode terminal 127. The temperature detection unit 124 detects the temperature with the use of a temperature detection terminal (so-called T terminal) 126.

The control unit 121 controls the operation (including the usage state of the power supply 111) of the whole battery pack. The control unit 121 includes, for example, a central processing unit (CPU) or a processor and a memory.

For example, when the battery voltage reaches the overcharge detection voltage, the control unit 121 disconnects the switch unit 122, thereby preventing any charging current from flowing through the current path of the power supply 111. Further, for example, when a large current flows during charging, the control unit 121 disconnects the switch unit 122, thereby shutting off the charging current.

On the other hand, for example, when the battery voltage reaches the overdischarge detection voltage, the control unit 121 disconnects the switch unit 122, thereby preventing any discharging current from flowing through the current path of the power supply 111. Further, for example, when a large current flows during discharging, the control unit 121 disconnects the switch unit 122, thereby shutting off the discharging current.

The overcharge detection voltage is, for example, 4.2 V±0.05 V, and the overdischarge detection voltage is, for example, 2.4 V±0.1 V.

In response to an instruction from the control unit 121, the switch unit 122 switches the usage state of the power supply 111, that is, whether there is a connection between the power supply 111 and an external device. The switch unit 122 includes, for example, a charge control switch and a discharge control switch. The charge control switch and the discharge control switch each serve as, for example, semiconductor switches such as a field effect transistor (MOSFET) using a metal oxide semiconductor. The charge/discharge current is detected, for example, on the basis of the ON resistance of the switch unit 122.

The temperature detection unit 124 measures the temperature of the power supply 111, and outputs the temperature measurement result to the control unit 121. The temperature detection unit 124 includes, for example, a temperature detection element such as a thermistor. The measurement result of the temperature measured by the temperature detection unit 124 is used when the control unit 121 controls charge/discharge in the case of abnormal heat generation, when the control unit 121 executes correction processing in the case of remaining capacity calculation, and the like.

It should be understood that the circuit board 116 does not necessarily include the PTC element 123. In this case, the circuit board 116 may be separately provided with a PTC element.

Figure 29:
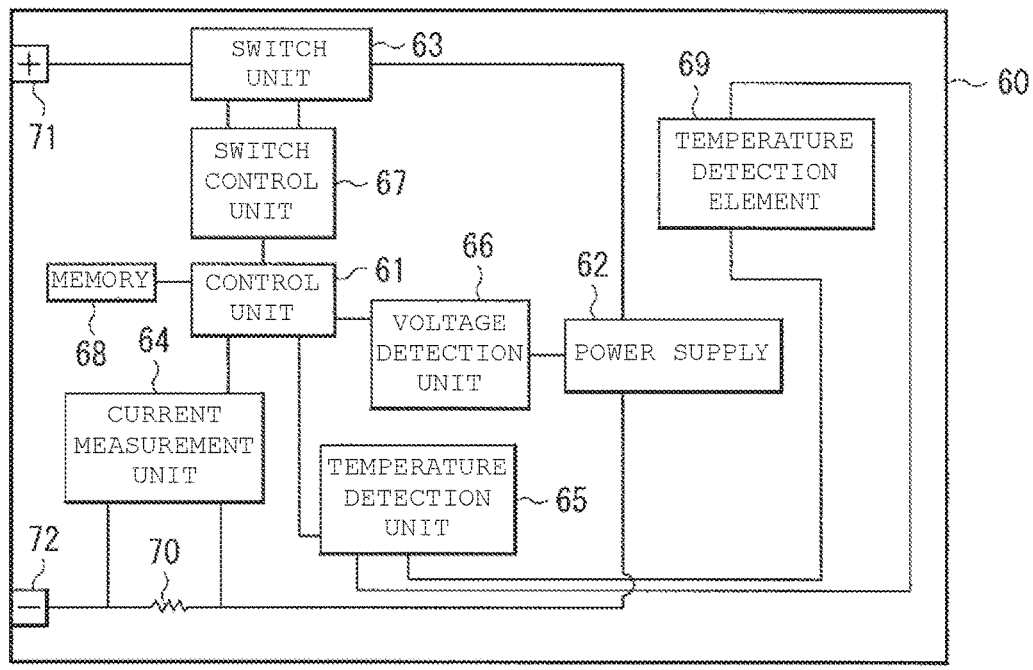
FIG. 29 is a block diagram illustrating a configuration of an application example (battery pack: assembled battery) of a secondary battery according to an embodiment of the present technology.

FIG. 29 illustrates a block configuration of a battery pack that uses an assembled battery.

This battery pack includes, for example, inside a housing 60, a control unit 61 (controller), a power supply 62, a switch unit 63 (switch), a current measurement unit 64, a temperature detection unit 65, a voltage detection unit 66, a switch control unit 67, a memory 68, a temperature detection element 69, a current detection resistor 70, a positive electrode terminal 71, and a negative electrode terminal 72. The housing 60 includes, for example, a plastic material.

The control unit 61 controls the operation (including the usage state of the power supply 62) of the whole battery pack. The control unit 61 includes, for example, a CPU or a processor. The power supply 62 is an assembled battery including two or more secondary batteries according to the present technology, and the connection form of the two or more secondary batteries may be a connection in series, a connection in parallel, or a mixed type of both the connections. To give an example, the power supply 62 includes six secondary batteries connected in the form of two in parallel and three in series.

In response to an instruction from the control unit 61, the switch unit 63 switches the usage state of the power supply 62, that is, whether there is a connection between the power supply 62 and an external device. The switch unit 63 includes, for example, a charge control switch, a discharge control switch, a charging diode, and a discharging diode.

The charge control switch and the discharge control switch each serve as, for example, semiconductor switches such as a field effect transistor (MOSFET) using a metal oxide semiconductor.

The current measurement unit 64 measures current through the use of the current detection resistor 70, and outputs the current measurement result to the control unit 61. The temperature detection unit 65 measures a temperature through the use of the temperature detection element 69, and outputs the temperature measurement result to the control unit 61. The temperature measurement result is used, for example, when the control unit 61 controls charge/discharge in the case of abnormal heat generation, and when the control unit 61 executes correction processing in the case of remaining capacity calculation. The voltage detection unit 66 measures the voltage of the secondary battery in the power supply 62, and supplies, to the control unit 61, the measurement result of the analog-digital converted voltage.

The switch control unit 67 controls the operation of the switch unit 63 in response to the signals input from each of the current measurement unit 64 and the voltage detection unit 66.

For example, when the battery voltage reaches the overcharge detection voltage, the switch control unit 67 disconnects the switch unit 63 (charge control switch), thereby preventing any charging current from flowing through the current path of the power supply 62. Thus, only discharge is allowed via the discharging diode in the power supply 62. For example, when a large current flows during charging, the switch control unit 67 cuts off the charging current.

In addition, for example, when the battery voltage reaches the overdischarge detection voltage, the switch control unit 67 disconnects the switch unit 63 (discharge control switch), thereby preventing any discharging current from flowing through the current path of the power supply 62. Thus, only charge is allowed via the charging diode in the power supply 62. For example, when a large current flows during discharging, the switch control unit 67 cuts off the discharging current.

The overcharge detection voltage is, for example, 4.2 V±0.05 V, and the overdischarge detection voltage is, for example, 2.4 V±0.1 V.

The memory 68 includes, for example, an EEPROM that is a non-volatile memory. The memory 68 stores, for example, numerical values calculated by the control unit 61, and information on the secondary battery, measured at the stage of producing process (for example, internal resistance in the initial state). Further, storing the full charge capacity of the secondary battery in the memory 68 makes it possible for the control unit 61 to grasp information such as the remaining capacity.

The temperature detection element 69 measures the temperature of the power supply 62, and outputs the temperature measurement result to the control unit 61. The temperature detection element 69 includes, for example, a thermistor.

Each of the positive electrode terminal 71 and the negative electrode terminal 72 is a terminal connected to an external device (for example, a laptop personal computer) operated through the use of the battery pack, an external device (for example, a charger) used for charging the battery pack, or the like. The power supply 62 is charged and discharged via the positive electrode terminal 71 and the negative electrode terminal 72.

Figure 30:
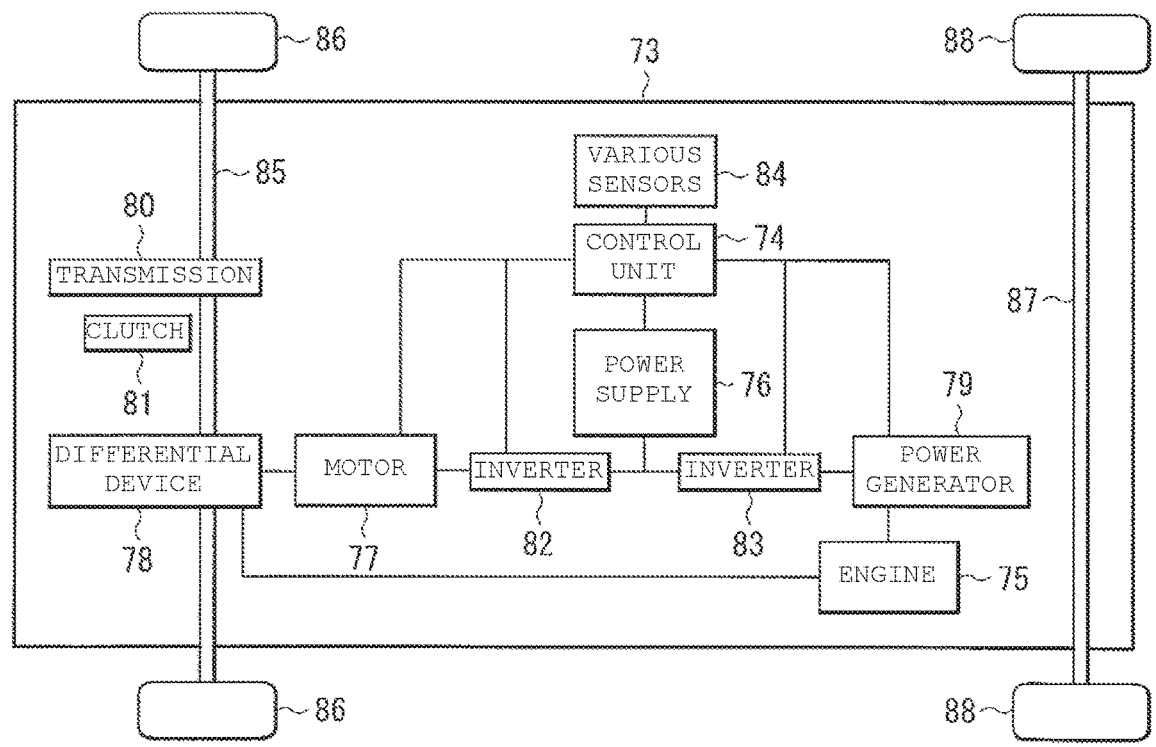
FIG. 30 is a block diagram illustrating a configuration of an application example (electric vehicle) of a secondary battery according to an embodiment of the present technology.

FIG. 30 illustrates a block configuration of a hybrid car as an example of an electric vehicle.

The electric vehicle includes, for example, inside a metallic housing 73, a control unit 74 (controller), an engine 75, a power supply 76, a motor 77 for driving, a differential device 78, a power generator 79, a transmission 80, a clutch 81, an inverter 82, an inverter 83, and various sensors 84. Besides, the electric vehicle includes, for example, a front-wheel drive shaft 85 and front wheels 86 connected to the differential device 78 and the transmission 80, and a rear-wheel drive shaft 87 and rear wheels 88.

This electric vehicle can travel, for example, with any one of the engine 75 and the motor 77 as a driving source. The engine 75 is a main power source, for example, a gasoline engine. When the engine 75 is adopted as a power source, the driving force (torque) of the engine 75 is transmitted to the front wheels 86 or the rear wheels 88 via, for example, the differential device 78, the transmission 80, and the clutch 81 which are driving units (driver). Further, the torque of the engine 75 is transmitted to the power generator 79, the power generator 79 thus generates alternating-current power by the use of the torque, and the alternating-current power is converted to direct-current power via the inverter 83, and thus stored in the power supply 76. On the other hand, when the motor 77 as a conversion unit (converter) is adopted as a power source, the electric power (direct-current power) supplied from the power supply 76 is converted to alternating-current power via the inverter 82, and the motor 77 is thus driven by the use of the alternating-current power. The driving force (torque) converted from the electric power by the motor 77 is transmitted to the front wheels 86 and the rear wheels 88 via, for example, the differential device 78, the transmission 80, and the clutch 81 which are driving units.

The electric vehicle may be configured such that when the electric vehicle is decelerated via a braking mechanism, the resistance force at the time of deceleration is transmitted as a torque to the motor 77, and the motor 77 thus generates alternating-current power by the use of the torque. This alternating-current power is converted to direct-current power via the inverter 82, and the direct-current regenerative power is thus preferably stored in the power supply 76.

The control unit 74 controls the operation of the whole electric vehicle. The control unit 74 includes, for example, a CPU. The power supply 76 includes one or two or more secondary batteries according to the present technology. The power supply 76 may be connected to an external power supply, and supplied with electric power from the external power supply to store the electric power. The various sensors 84 are used, for example, for controlling the rotation speed of the engine 75, and controlling the opening (throttle opening) of a throttle valve. The various sensors 84 include, for example, any one of, or two or more of a speed sensor, an acceleration sensor, and an engine speed sensor.

Although the case where the electric vehicle is a hybrid car has been given as an example, the electric vehicle may be a vehicle (electric car) that operates through the use of only the power supply 76 and the motor 77 without using the engine 75.

Figure 31:
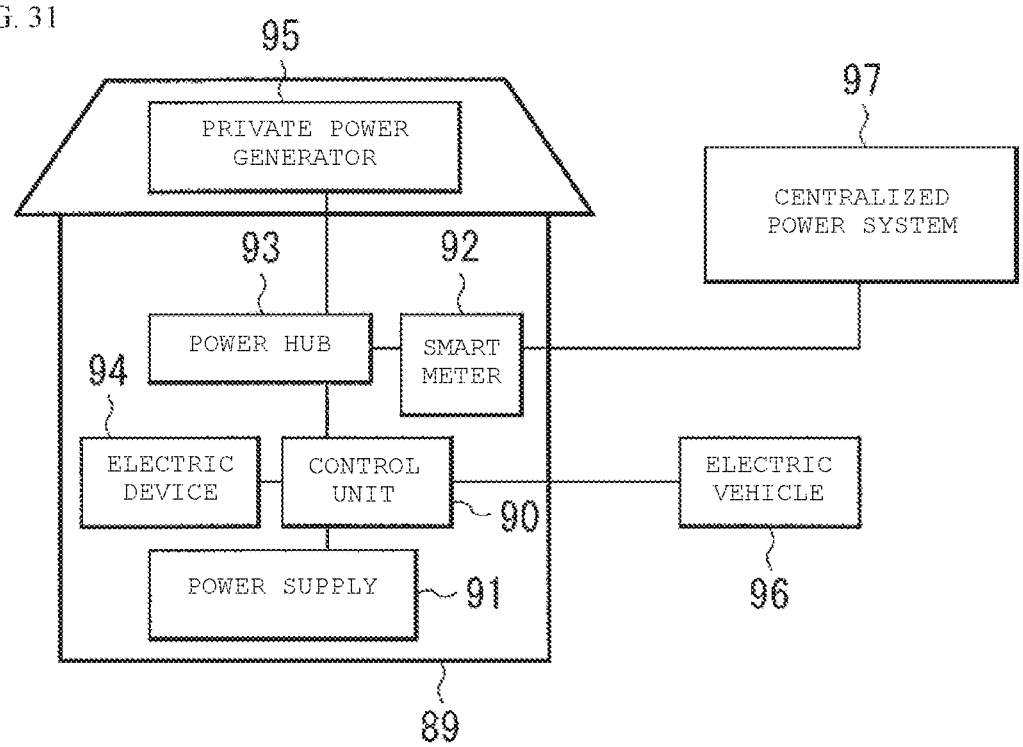
FIG. 31 is a block diagram illustrating a configuration of an application example (power storage system) of a secondary battery according to an embodiment of the present technology.

FIG. 31 illustrates a block configuration of a power storage system.

This power storage system includes, for example, a control unit 90, a power supply 91, a smart meter 92, and a power hub 93 inside a house 89 such as a general house and a commercial building.

In this regard, the power supply 91 is connected to, for example, an electric device 94 installed inside the house 89, and connectable to an electric vehicle 96 parked outside the house 89. Further, the power supply 91 is, for example, connected via the power hub 93 to a private power generator

95 installed in the house 89, and connectable to an external centralized power system 97 via the smart meter 92 and the power hub 93.

The electric device 94 includes, for example, one or two or more home electric appliances, and the home electric appliances may be, for example, a refrigerator, an air conditioner, a television, and a water heater. The private power generator 95 includes, for example, any one of, or two or more of a solar power generator and a wind power generator. The electric vehicle 96 includes, for example, any one of, or two or more of electric cars, electric bikes, and hybrid cars. The centralized power system 97 includes, for example, any one of, or two or more of a thermal power plant, a nuclear power plant, a hydraulic power plant, and a wind power plant.

The control unit 90 controls the operation (including the usage state of the power supply 91) of the whole power storage system. The control unit 90 includes, for example, a CPU. The power supply 91 includes one or two or more secondary batteries according to the present technology. The smart meter 92 is, for example, a network-compatible power meter installed in the house 89 on the power demand side, which is capable of communicating with the power supply side. Accordingly, the smart meter 92 controls the balance between demand and supply of electric power in the house 89 while communicating with the outside, thereby allowing highly efficient and stable supply of energy.

In this power storage system, for example, electric power is stored in the power supply 91 via the smart meter 92 and the power hub 93 from the centralized power system 97, which is an external power supply, and electric power is stored in the power supply 91 via the power hub 93 from the private power generator 95, which is an independent power supply. The electric power stored in the power supply 91 is supplied to the electric device 94 and the electric vehicle 96 in response to an instruction from the control unit 90, thus allowing the operation of the electric device 94, and allowing the electric vehicle 96 to be charged. More specifically, the power storage system is a system that allows electric power to be stored and supplied in the house 89 with the use of the power supply 91.

It is possible to use the electric power stored in the power supply 91, if necessary. For this reason, for example, electric power can be stored in the power supply 91 from the centralized power system 97 at midnight when the electricity charge is inexpensive, and the electric power stored in the power supply 91 can be used during the day when the electricity charge is expensive.

The power storage system described above may be installed for every single house (one household), or may be installed for every multiple houses (multiple households).

Figure 32:
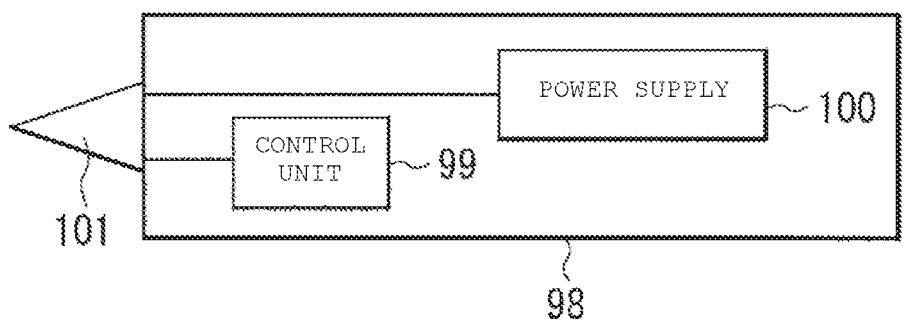
FIG. 32 is a block diagram illustrating a configuration of an application example (power tool) of a secondary battery according to an embodiment of the present technology.

FIG. 32 illustrates a block configuration of a power tool.

The power tool described herein is, for example, an electric drill. The power tool includes, for example, a control unit 99 and a power supply 100 inside a tool body 98. For example, a drill part 101 as a movable part is operably (rotatably) attached to the tool body 98.

The tool body 98 includes, for example, a plastic material. The control unit 99 controls the operation (including the usage state of the power supply 100) of the whole power tool. The control unit 99 includes, for example, a CPU. The power supply 100 includes one or two or more secondary batteries according to the present technology. The control unit 99 supplies electric power from the power supply 100 to the drill part 101 in response to an operation of an operation switch.

Examples of the present technology will be described.

Examples 1-1 to 1-6

Cylindrical lithium ion secondary batteries illustrated in FIGS. 1 and 13 were produced in accordance with the following procedure.

In the case of producing the positive electrode 21, first, 94 parts by mass of a positive electrode active material (LiCoO$_2$), 3 parts by mass of a positive electrode binder (polyvinylidene fluoride), and 3 parts by mass of a positive electrode conductive agent (graphite) were mixed to prepare a positive electrode mixture. Then, the positive electrode mixture was put in an organic solvent (N-methyl-2-pyrrolidone), the organic solvent was then stirred, thereby preparing a paste-like positive electrode mixture slurry. Then, the positive electrode mixture slurry was applied to both sides of the positive electrode current collector 21A (15 µm thick belt-like aluminum foil) with the use of a coating device, and the positive electrode mixture slurry was then dried to form the positive electrode active material layer 21B. Finally, the positive electrode active material layer 21B was subjected to compression-molding with the use of a roll press machine.

In the case of producing the negative electrode 22, first, 95 parts by mass of a negative electrode active material (graphite), 3 parts by mass of a negative electrode binder (polyvinylidene fluoride), and 2 parts by mass of a negative electrode conductive agent (carbon black) were mixed to prepare a negative electrode mixture. Then, the negative electrode mixture was dispersed in an organic solvent (N-methyl-2-pyrrolidone) to prepare a paste-like negative electrode mixture slurry. Then, the negative electrode mixture slurry was applied to both sides of the negative electrode current collector 22A (15 µm-thick copper foil) with the use of a coating device, and the negative electrode mixture slurry was then dried to form the negative electrode active material layer 22B. Finally, the negative electrode active material layer 22B was subjected to compression-molding with the use of a roll press machine.

In the case of preparing an electrolytic solution, an electrolyte salt (LiPF$_6$) was added to a solvent (ethylene carbonate, ethyl methyl carbonate, and dimethyl carbonate), and then the solvent was stirred. In this case, the mixing ratio (weight ratio) of the solvent was set to ethylene carbonate:ethyl methyl carbonate:dimethyl carbonate=20:20:60 and the content of the electrolyte salt was set to 1 mol/kg.

In the case of assembling a secondary battery, first, the positive electrode lead 25 made of aluminum was welded to the positive electrode current collector 21A, and the negative electrode lead 26 made of nickel was welded to the negative electrode current collector 22A. Then, the positive electrode 21 and the negative electrode 22 were laminated with the separator 23 (16 µm-thick porous polyethylene film) interposed therebetween and wound, and then the winding end portion was fixed with the adhesive tape, whereby the wound electrode body 20 was fabricated. Then, the center pin 24 was inserted into the wound center space 20C of the wound electrode body 20.

Subsequently, as illustrated in FIGS. 2 to 9, the safety valve mechanism 30 including the safety cover 31 made of aluminum, the disk holder 32 made of polypropylene, the stripper disk 33 made of aluminum, and the sub-disk 34 made of aluminum was provided. In this case, a plurality of safety valve mechanisms 30 was prepared using a plurality of stripper disks 33 having different numbers of the opening portions 33K and different numbers of the protrusion portions 33T. The detailed configurations of the stripper disks 33 are as shown in Table 1. Here, the number (pieces) of the opening portions 33K, the number (pieces) of the protrusion portions 33T, the opening angle θ1 (°), and the non-opening angles θ2 and θ3 (°) were respectively changed while the opening ratio (%) was maintained at a certain level, whereby a relationship (phase relationship) between the phase relating to the arrangement of the plurality of opening portions 33K and the phase relating to the arrangement of the plurality of protrusion portions 33T was changed.

Subsequently, the wound electrode body 20 was housed inside the battery can 11 made of nickel-plated iron while the wound electrode body 20 was sandwiched by the pair of insulating plates 12 and 13. In this case, an end of the positive electrode lead 25 was welded to the safety valve mechanism 30 (the sub-disk 34), and an end of the negative electrode lead 26 was welded to the battery can 11. Then, an electrolytic solution was injected into the battery can 11 using the depressurization method, thereby impregnating the wound electrode body 20 with the electrolytic solution. Finally, the battery cover 14, the thermosensitive resistive element 15, and the safety valve mechanism 30 were crimped to the opening end of the battery can 11 using the gasket 16.

In the case of examining the gas releasing property, a combustion pass rate (%) was determined by performing a combustion test of the secondary battery.

In this case, the secondary battery was first charged in an ambient temperature environment (temperature=23° C.). Then, the secondary battery in a charged state was heated using a burner, and the state of the heated secondary battery was judged. In this case, the secondary battery was not ruptured, and thus the case where the positive electrode 21, the negative electrode 22 and the like housed inside the battery can 11 were not ejected to the outside was judged as "passed". On the other hand, the secondary battery was ruptured, and thus the case where the positive electrode 21, the negative electrode 22 and the like hosed inside the battery can 11 were ejected to the outside was judged as "failed". Then, the judging operation was repeated until the total number of the above-described judging operations reached 100. Namely, 100 judging operation results were obtained by repeating the combustion test using 100 secondary batteries. Finally, the combustion pass rate (%)=(the number of secondary batteries judged as "passed"/the total number of secondary batteries (=100))×100 was calculated.

TABLE 1

| Experimental Example | Opening portion Number (pieces) | Protrusion portion Number (pieces) | Opening angle θ1 (°) | Non-opening angle θ2 (°) | Non-opening angle θ3 (°) | Opening ratio (%) | Phase relationship | Drop pass rate (%) | Combustion pass rate (%) |
|---|---|---|---|---|---|---|---|---|---|
| 1-1 | 6 | 6 | 40 | 20 | 22 | 46.9 | Coincided | 95 | 90 |
| 1-2 | 7 | 7 | 34.3 | 17.1 | 22 | 46.9 | Coincided | 99 | 90 |
| 1-3 | 8 | 8 | 30 | 15 | 22 | 46.9 | Coincided | 100 | 90 |
| 1-4 | 6 | 6 | 40 | 20 | 22 | 46.9 | Not coincided | 86 | 90 |
| 1-5 | 7 | 7 | 34.3 | 17.1 | 22 | 46.9 | Not coincided | 92 | 90 |
| 1-6 | 8 | 8 | 30 | 15 | 22 | 46.9 | Not coincided | 95 | 90 |

As a result, a cylindrical lithium ion secondary battery including the safety valve mechanism 30 was completed.

In order to evaluate the safety of the secondary battery, the physical durability and gas releasing property of the secondary battery were examined, and the results shown in Table 1 were obtained.

In the case of examining the physical durability, a drop pass rate (%) was obtained by performing a drop test of the secondary battery.

In this case, the secondary battery was first charged in an ambient temperature environment (temperature=23° C.). In the case of charging, the secondary battery was charged with a constant current of 0.2 C until the voltage reached 4.4 V. The term "0.2 C" refers to a current value for fully discharging the battery capacity (theoretical capacity) in 5 hours. Subsequently, the operation of dropping the battery in a charged state from a high place (height=10 m) was repeated 30 times. Then, the voltage of the secondary battery was measured using a tester, and the voltage was judged. In this case, the case where the voltage was 3.0 V or more was judged as "passed". On the other hand, the case where the voltage was less than 3.0 V was judged as "failed". Then, the judging operation was repeated until the total number of the above-described judging operations reached 100. Namely, 100 judging operation results were obtained by repeating the drop test using 100 secondary batteries. Finally, the drop pass rate (%)=(the number of secondary batteries judged as "passed"/the total number of secondary batteries (=100))×100 was calculated.

In the case where the number of the opening portions 33K and the number of the protrusion portions 33T coincided with each other, when the phase relating to the arrangement of the plurality of opening portions 33K and the phase relating to the arrangement of the plurality of protrusion portions 33T coincided with each other (Experimental Examples 1-1 to 1-3), the drop pass rate was improved while maintaining a high combustion pass rate independently of the number of the opening portions 33K and the number of the protrusion portions 33T, compared with the case where both the phases did not coincide with each other (Experimental Examples 1-4 to 1-6).

This result indicates that when the number of the opening portions 33K and the number of the protrusion portions 33T coincide with each other, and the phase relating to the arrangement of the plurality of opening portions 33K and the phase relating to the arrangement of the plurality of protrusion portions 33T coincide with each other, the following advantages can be obtained.

Firstly, the physical strength of the stripper disk 33 is improved, and thus the stripper disk 33 is less likely to be deformed and damaged even when receiving an impact caused by dropping of the secondary battery. As a result, the stripper disk 33 is maintained until the plurality of opening portions 33K provided in the stripper disk 33 is utilized as a gas discharge path.

Secondly, when the safety cover 31 (the opening valve portion 31R) is opened in response to an increase in internal pressure of the battery can 11, the gas discharge paths through the plurality of opening portions 33K provided in the stripper disk 33 are released. As a result, a sufficient amount of gas generated inside the battery can 11 is stably discharged to the outside, whereby the secondary battery is less likely to be ruptured even if the internal pressure of the battery can 11 increases.

Figure 33:
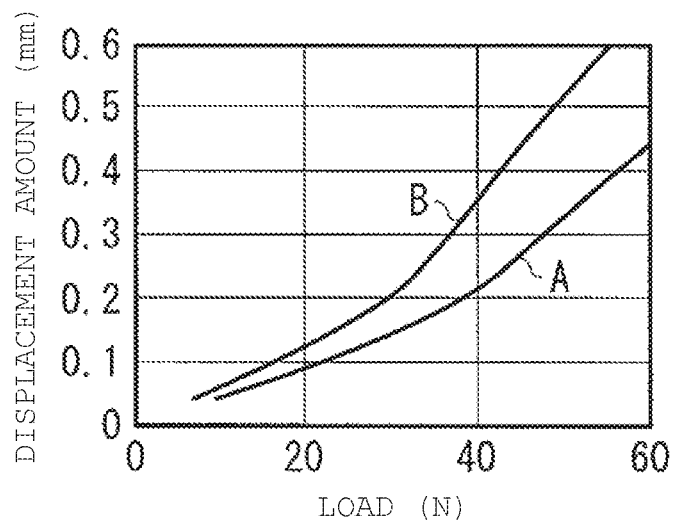
FIG. 33 is a diagram showing results of structural analysis simulation on physical durability of a stripper disk according to an embodiment of the present technology.

Here, in order to confirm this, the physical durability of the stripper disk 33 was examined using structural analysis simulation, and the result illustrated in FIG. 33 was obtained.

FIG. 33 shows analysis results on the physical durability of the stripper disk 33. In FIG. 33, a horizontal axis shows a load (N) supplied to the stripper disk 33 and a vertical axis shows a displacement amount (mm) of the stripper disk 33. However, an analysis line A represents the analysis result of Experimental Example 1-1, and an analysis line B represents the analysis result relating to Experimental Example 1-4. Further, the load is supplied to the stripper disk 33 from a direction orthogonal to the paper surface of FIG. 10.

As is clear from FIG. 33, when the number of the opening portions 33K and the number of the protrusion portions 33T coincided with each other, and the phase relating to the arrangement of the plurality of opening portions 33K and the phase relating to the arrangement of the plurality of protrusion portions 33T did not coincide with each other (the analysis line B), the stripper disk 33 was likely to be displaced in response to an increase in the load. This result indicates that the stripper disk 33 tends to be ruptured in response to an external force because the stripper disk 33 is likely to be deformed in response to the external force.

On the other hand, when the number of the opening portions 33K and the number of the protrusion portions 33T coincided with each other, and the phase relating to the arrangement of the plurality of opening portions 33K and the phase relating to the arrangement of the plurality of protrusion portions 33T coincided with each other (the analysis line A), the stripper disk 33 was less likely to be displaced in response to an increase in the load. This result indicates that the stripper disk 33 tends not to be ruptured because the stripper disk 33 is less likely to be deformed in response to an external force.

Examples 2-1 to 2-4

As shown in Table 2, secondary batteries were produced in the same procedure as in Experiment Example 1-1 to 1-3 except that the number of the opening portions 33K and the number of the protrusion portions 33T were changed by changing each of the opening angle θ1 and the non-opening angles θ2 and θ3 while maintaining the opening ratio at a certain level, and the safety of the secondary batteries was evaluated.

TABLE 2

| Experimental Example | Opening portion Number (pieces) | Protrusion portion Number (pieces) | Opening angle θ1 (°) | Non-opening angle θ2 (°) | Non-opening angle θ3 (°) | Opening ratio (%) | Phase relationship | Drop pass rate (%) | Combustion pass rate (%) |
|---|---|---|---|---|---|---|---|---|---|
| 2-1 | 3 | 3 | 80 | 40 | 22 | 46.9 | Coincided | 35 | 90 |
| 2-2 | 4 | 4 | 60 | 30 | 22 | 46.9 | Coincided | 60 | 90 |
| 2-3 | 5 | 5 | 48 | 24 | 22 | 46.9 | Coincided | 80 | 90 |
| 1-1 | 6 | 6 | 40 | 20 | 22 | 46.9 | Coincided | 95 | 90 |
| 1-2 | 7 | 7 | 34.3 | 17.1 | 22 | 46.9 | Coincided | 99 | 90 |
| 1-3 | 8 | 8 | 30 | 15 | 22 | 46.9 | Coincided | 100 | 90 |
| 2-4 | 9 | 9 | 26.7 | 13.3 | 22 | 46.9 | Coincided | 80 | 90 |

In the case where the number of the opening portions 33K was from 6 to 8 and the number of the protrusion portions 33T was from 6 to 8 (Experimental Examples 1-1 to 1-3), a higher drop pass rate was obtained while maintaining a high combustion pass rate, as compared with the case where both the number of the opening portions 33K and the number of the protrusion portions 33T were 5 or less and 9 or more (Experimental Examples 2-1 to 2-4).

Examples 3-1 to 3-5

As shown in Table 3, secondary batteries were produced in the same procedure as in Experiment Example 1-1 except that the opening ratio was changed by changing each of the opening angle θ1 and the non-opening angles θ2 and θ3 while maintaining the number of the opening portions 33K and the number of the protrusion portions 33T at a certain level, and the safety of the secondary batteries was evaluated.

TABLE 3

| Experimental Example | Opening portion Number (pieces) | Protrusion portion Number (pieces) | Opening angle θ1 (°) | Non-opening angle θ2 (°) | Non-opening angle θ3 (°) | Opening ratio (%) | Phase relationship | Drop pass rate (%) | Combustion pass rate (%) |
|---|---|---|---|---|---|---|---|---|---|
| 3-1 | 6 | 6 | 10 | 50 | 22 | 11.7 | Coincided | 100 | 50 |
| 3-2 | 6 | 6 | 20 | 40 | 22 | 23.4 | Coincided | 99 | 75 |

TABLE 3-continued

| Experimental Example | Opening portion Number (pieces) | Protrusion portion Number (pieces) | Opening angle θ1 (°) | Non-opening angle θ2 (°) | Non-opening angle θ3 (°) | Opening ratio (%) | Phase relationship | Drop pass rate (%) | Combustion pass rate (%) |
|---|---|---|---|---|---|---|---|---|---|
| 3-3 | 6 | 6 | 30 | 30 | 22 | 35.2 | Coincided | 97 | 84 |
| 1-1 | 6 | 6 | 40 | 20 | 22 | 46.9 | Coincided | 95 | 90 |
| 3-4 | 6 | 6 | 50 | 10 | 22 | 58.6 | Coincided | 80 | 95 |
| 3-5 | 6 | 6 | 55 | 5 | 22 | 64.5 | Coincided | 60 | 100 |

In the case where the opening ratio was from 20 to 60% (Experimental Examples 1-1, and 3-2 to 3-4), a higher drop pass rate was obtained and a higher combustion pass rate was also obtained, as compared with the case where the opening ratio was smaller than 20% and the opening ratio was larger than 60% (Experimental Examples 3-1 and 3-5).

The results shown in Tables 1 to 3 indicate that when the number of the opening portions 33K and the number of the protrusion portions 33T are equal to each other, and each of the plurality of opening portions 33K and each of the plurality of protrusion portions 33T are opposed to each other in the direction toward the center P of the stripper disk 33, both the physical durability and the gas releasing property are improved. Therefore, the safety of the secondary battery was improved.

The present technology has been described above with reference to an embodiment and examples, but the present technology is not limited to the aspects described in the embodiment and the examples, and various modifications are possible.

Specifically, the case where the battery structure is cylindrical has been described, for example, but the present technology is not limited thereto. The secondary battery of the present technology may be applied to, for example, cases having other battery structures such as a laminate film structure, a square structure, and a coin structure.

The case where the battery element has the wound structure has been described, for example, but the present technology is not limited thereto. The secondary battery of the present technology may be applied to, for example, the case where the battery element has another structure such as a laminated structure.

Further, the secondary battery (lithium ion secondary battery) in which the capacity of the negative electrode is obtained through the occlusion and release of lithium as well as the secondary battery (lithium metal secondary battery) in which the capacity of the negative electrode is obtained through the deposition and dissolution of lithium have been described. However, the principle of obtaining the capacity of the negative electrode in the secondary battery of the present technology is not particularly limited. Specifically, for example, the secondary battery of the present technology may be a secondary battery in which the capacity of the negative electrode material capable of occluding and releasing lithium is made smaller than the capacity of the positive electrode, and the capacity of the negative electrode is obtained by the sum of the capacity through occlusion and release of lithium and the capacity through the deposition and dissolution of lithium.

Although the case where lithium is used as an electrode reactant has been described, it is not limited thereto. The electrode reactant may be, for example, another element of Group 1 in the long-periodic table (such as sodium or potassium), an element of Group 2 in the long-periodic table (such as magnesium or calcium) or another light metal (such as aluminum). Further, the electrode reactant may be an alloy containing any one of, or two or more of the series of elements.

It should be understood that the effects described in this description are merely considered by way of example, and not to be considered limited, and there may be other effects.

The present technology is described below in further detail according to an embodiment.

(1) A secondary battery including:
a battery element that includes a positive electrode, a negative electrode, and an electrolytic solution;
a housing member that houses the battery element; and
a safety valve mechanism that is attached to the housing member,
where
the safety valve mechanism includes:
a valve member including an opening valve portion capable of being opened; and
an opening member including a plurality of opening portions which is radially arranged, in a region opposed to the opening valve portion, from a center of the region as a base point, and a plurality of protrusion portions which is radially arranged, in a region outside the plurality of opening portions, from the center as a base point and which protrudes toward the plurality of opening portions,
a number of the opening portions and a number of the protrusion portions are equal to each other, and
each of the plurality of opening portions and each of the plurality of protrusion portions are opposed to each other in a direction toward the center.

(2) The secondary battery according to (1), where
the number of the opening portions is 6 or more and 8 or less, and
the number of the protrusion portions is 6 or more and 8 or less.

(3) The secondary battery according to (1) or (2), where an opening ratio (%) of the plurality of opening portions calculated by the following equation (1) is 20% or more and 60% or less. Opening ratio (%)=(P1/P2)×100 (1)
(P1 is a sum of opening areas of the opening portions. P2 is an area of the opening valve portion.)

(4) The secondary battery according to any one of (1) to (3), where the secondary battery is a lithium ion secondary battery.

(5) A battery pack including:
the secondary battery according to any one of (1) to (4);
a control unit that controls an operation of the secondary battery; and
a switch unit that switches the operation of the secondary battery in accordance with an instruction from the control unit.

(6) An electric vehicle including:
the secondary battery according to any one of (1) to (4);
a conversion unit that converts electric power supplied from the secondary battery, to a driving force;
a driving unit that drives in response to the driving force; and
a control unit that controls an operation of the secondary battery.

(7) A power storage system including:
the secondary battery according to any one of (1) to (4);
one or two or more electric devices that are supplied with electric power from the secondary battery; and
a control unit that controls a power supply to the electric devices from the secondary battery.

(8) A power tool including:
the secondary battery according to any one of (1) to (4); and
a movable part to which electric power is supplied from the secondary battery.

(9) An electronic device including the secondary battery according to any one of (1) to (4) as a power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
a battery element including a positive electrode, a negative electrode, and an electrolytic solution;
a housing member configured to accommodate the battery element; and
a safety valve mechanism attached to the housing member,
wherein
the safety valve mechanism includes:
  a valve member including an opening valve portion configured to be opened; and
  an opening member including a plurality of opening portions radially arranged in a region opposed to the opening valve portion from a center of the region as a base point, and a plurality of protrusion portions radially arranged in a region outside the plurality of opening portions from the center and the plurality of protrusion portions protrude toward the plurality of opening portions,
  a number of the opening portions and a number of the protrusion portions are equal to each other,
  each of the plurality of opening portions and each of the plurality of protrusion portions are opposed to each other in a direction toward the center, and
  a plurality of through holes that overlap with the plurality of protrusion portions in a plan view, wherein
  the number of the opening portions is 6 or more and 8 or less,
  the number of the protrusion portions is 6 or more and 8 or less, and
  the plurality of opening portions and the plurality of protrusion portions are arranged with a predetermined interval in a direction along an outer edge of the opening member, and
wherein an opening ratio (%) of the plurality of opening portions calculated by an equation (1) is 20% or more and 60% or less, $$\text{Opening ratio } (\%) = (P1/P2) \times 100 \tag{1}$$

wherein P1 is a sum of opening areas of the opening portions, and P2 is an area of the opening valve portion.

2. The secondary battery according to claim 1, wherein the secondary battery includes a lithium ion secondary battery.

3. A battery pack comprising:
a secondary battery;
a controller configured to control an operation of the secondary battery; and
a switch configured to switch the operation of the secondary battery in response to an instruction from the controller;
wherein
the secondary battery includes:
  a battery element including a positive electrode, a negative electrode, and an electrolytic solution;
  a housing member configured to accommodate the battery element; and
  a safety valve mechanism attached to the housing member,
the safety valve mechanism includes:
  a valve member including an opening valve portion configured to be opened; and
  an opening member including a plurality of opening portions radially arranged in a region opposed to the opening valve portion from a center of the region as a base point, and a plurality of protrusion portions radially arranged in a region outside the plurality of opening portions from the center and the plurality of protrusion portions protrude toward the plurality of opening portions,
  a number of the opening portions and a number of the protrusion portions are equal to each other,
  each of the plurality of opening portions and each of the plurality of protrusion portions are opposed to each other in a direction toward the center, and
  a plurality of through holes that overlap with the plurality of protrusion portions in a plan view, wherein
  the number of the opening portions is 6 or more and 8 or less,
  the number of the protrusion portions is 6 or more and 8 or less, and
  the plurality of opening portions and the plurality of protrusion portions are arranged with a predetermined interval in a direction along an outer edge of the opening member, and
wherein an opening ratio (%) of the plurality of opening portions calculated by an equation (1) is 20% or more and 60% or less, $$\text{Opening ratio } (\%) = (P1/P2) \times 100 \tag{1}$$

wherein P1 is a sum of opening areas of the opening portions, and P2 is an area of the opening valve portion.

4. An electric vehicle comprising:
a secondary battery;
a converter configured to convert electric power supplied from the secondary battery into driving force;
a driver configured to drive in response to the driving force; and
a controller configured to control an operation of the secondary battery;

wherein
the secondary battery includes:
- a battery element including a positive electrode, a negative electrode, and an electrolytic solution;
- a housing member configured to be accommodate the battery element; and
- a safety valve mechanism attached to the housing member, the safety valve mechanism includes:
- a valve member including an opening valve portion configured to be opened; and
- an opening member including a plurality of opening portions radially arranged in a region opposed to the opening valve portion from a center of the region as a base point, and a plurality of protrusion portions radially arranged in a region outside the plurality of opening portions from the center and the plurality of protrusion portions protrude toward the plurality of opening portions,
- a number of the opening portions and a number of the protrusion portions are equal to each other,
- each of the plurality of opening portions and each of the plurality of protrusion portions are opposed to each other in a direction toward the center, and
- a plurality of through holes that overlap with the plurality of protrusion portions in a plan view, wherein
the number of the opening portions is 6 or more and 8 or less,
the number of the protrusion portions is 6 or more and 8 or less, and
the plurality of opening portions and the plurality of protrusion portions are arranged with a predetermined interval in a direction along an outer edge of the opening member, and wherein an opening ratio (%) of the plurality of opening portions calculated by an equation (1) is 20% or more and 60% or less, $$\text{Opening ratio (\%)} = (P1/P2) \times 100 \qquad (1)$$

wherein P1 is a sum of opening areas of the opening portions, and P2 is an area of the opening valve portion.

5. A power storage system comprising:
the secondary battery according to claim 1;
one or more electric devices to which electric power is configured to be supplied from the secondary battery; and
a controller configured to control electric power supplied from the secondary battery to the electric devices.

6. A power tool comprising:
the secondary battery according to claim 1; and
a movable part to which electric power is configured to be supplied from the secondary battery.

7. An electronic device comprising the secondary battery according to claim 1 as a power supply source.

* * * * *